United States Patent
Ledbetter et al.

(10) Patent No.: US 7,199,785 B2
(45) Date of Patent: *Apr. 3, 2007

(54) INPUT DEVICE INCLUDING A WHEEL ASSEMBLY FOR SCROLLING AN IMAGE IN MULTIPLE DIRECTIONS

(75) Inventors: Carl J Ledbetter, Lynnwood, WA (US); Daan Lindhout, Seattle, WA (US); Aditha Adams, Seattle, WA (US); Hugh E. McLoone, Bellevue, WA (US); Timothy Michael Muss, Seattle, WA (US); James Y. Koo, Renton, WA (US); Gino Garcia, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/193,460

(22) Filed: Aug. 1, 2005

(65) Prior Publication Data

US 2006/0007153 A1    Jan. 12, 2006

Related U.S. Application Data

(63) Continuation of application No. 11/094,139, filed on Mar. 31, 2005, which is a continuation of application No. 10/184,000, filed on Jun. 28, 2002, now Pat. No. 7,079,110, which is a continuation-in-part of application No. 09/843,794, filed on Apr. 30, 2001, now Pat. No. 6,700,564.

(51) Int. Cl.
G09G 5/00 (2006.01)

(52) U.S. Cl. ............ 345/156; 345/164; 345/684; 345/157; 200/6 A

(58) Field of Classification Search ........ 345/156–169, 345/684–687; 348/734; 200/5 A, 6 A; 715/784–786; 273/148 B; 463/37–38
See application file for complete search history.

(56) References Cited

U.S. PATENT DOCUMENTS 4,712,101 A    12/1987   Culver (Continued)

FOREIGN PATENT DOCUMENTS

EP    1258019    11/2002

(Continued)

OTHER PUBLICATIONS

Web page reviewing "Kensington TurboRing Trackball"; http://www.avault.com/hardware/print_review.asp?review=turboring; publication date unknown, but believed to be prior to Jun. 28, 2002.

(Continued)

Primary Examiner—Lun-Yi Lao
(74) Attorney, Agent, or Firm—Banner & Witcoff, Ltd.

(57) ABSTRACT

A computer input device having a housing and a finger-engagable scrolling device. A portion of the scrolling device is endlessly rotatable about a first axis to preferably cause vertical scrolling of an image on a display. The scrolling device is pivotally movable relative to the housing about a second axis perpendicular to the first axis. The finger-engagable scrolling device may contain rotation sensor within a scroll wheel assembly. The finger-engagable scrolling device may also contain lateral arms extending laterally from the finger-engagable scrolling device.

20 Claims, 20 Drawing Sheets

U.S. PATENT DOCUMENTS

| | | | |
|---|---|---|---|
| 4,720,703 | A | 1/1988 | Schnarel, Jr. et al. |
| 5,063,289 | A | 11/1991 | Jasinski et al. |
| 5,235,868 | A | 8/1993 | Culver |
| 5,404,152 | A | 4/1995 | Nagai |
| 5,446,481 | A | 8/1995 | Gillick et al. |
| 5,477,508 | A | 12/1995 | Will |
| 5,510,811 | A | 4/1996 | Tobey et al. |
| 5,517,257 | A | 5/1996 | Dunn et al. |
| 5,521,617 | A | 5/1996 | Imai et al. |
| 5,530,455 | A | 6/1996 | Gillick et al. |
| 5,774,075 | A | 6/1998 | Palalau et al. |
| 5,808,568 | A | 9/1998 | Wu |
| 5,910,789 | A | 6/1999 | Vigen |
| 5,912,661 | A | 6/1999 | Siddiqui |
| 5,952,997 | A | 9/1999 | Hu |
| 5,956,018 | A | 9/1999 | Pejic et al. |
| 5,959,614 | A | 9/1999 | Ho |
| 5,963,197 | A | 10/1999 | Bacon et al. |
| 6,075,518 | A | 6/2000 | Pruchniak |
| 6,075,575 | A | 6/2000 | Schein et al. |
| 6,097,371 | A | 8/2000 | Siddiqui et al. |
| 6,097,372 | A | 8/2000 | Suzuki |
| D431,037 | S | 9/2000 | Varga et al. |
| 6,128,006 | A | 10/2000 | Rosenberg et al. |
| 6,132,118 | A | 10/2000 | Grezeszak |
| 6,188,393 | B1 | 2/2001 | Shu |
| 6,198,473 | B1 | 3/2001 | Armstrong |
| 6,281,881 | B1 | 8/2001 | Siddiqui et al. |
| 6,300,939 | B1 | 10/2001 | Decker et al. |
| 6,323,844 | B1 | 11/2001 | Yeh et al. |
| 6,337,679 | B1 * | 1/2002 | Chou .......................... 345/156 |
| 6,340,800 | B1 | 1/2002 | Zhai et al. |
| 6,340,966 | B1 | 1/2002 | Wang et al. |
| 6,348,912 | B1 | 2/2002 | Smith |
| 6,353,429 | B1 | 3/2002 | Long |
| 6,359,611 | B2 | 3/2002 | Chan |
| 6,380,927 | B1 | 4/2002 | Ostrum et al. |
| 6,424,355 | B2 | 7/2002 | Watanabe et al. |
| 6,519,003 | B1 | 2/2003 | Swayze |
| 6,522,321 | B1 | 2/2003 | Chen et al. |
| 6,534,730 | B2 | 3/2003 | Ohmoto et al. |
| 6,555,768 | B2 * | 4/2003 | Deruginsky et al. ........... 200/4 |
| 6,570,108 | B2 | 5/2003 | Lin |
| 6,608,616 | B2 | 8/2003 | Lin |
| 6,697,050 | B1 | 2/2004 | Shinohe et al. |
| 6,717,572 | B1 * | 4/2004 | Chou et al. ................. 345/157 |
| 6,809,275 | B1 | 10/2004 | Cheng |
| 2003/0025673 | A1 | 2/2003 | Ledbetter et al. |
| 2003/0076303 | A1 | 4/2003 | Huppi |
| 2003/0095096 | A1 | 5/2003 | Robbin et al. |
| 2003/0107547 | A1 | 6/2003 | Kehlstadt et al. |
| 2004/0001042 | A1 | 1/2004 | Lindhout et al. |
| 2004/0051392 | A1 | 3/2004 | Badarneh |
| 2004/0150623 | A1 | 8/2004 | Ledbetter |

FOREIGN PATENT DOCUMENTS

| | | |
|---|---|---|
| JP | 07-092939 | 4/1995 |
| JP | 2000200147 | 7/2000 |

OTHER PUBLICATIONS

Web page reviewing "TurboRing"; http://www.macworld.com/2000/10/reviews/turboring.html; publication date unknown, but believed to be prior to Jun. 28, 2002.

Web page from "Van's hardware"; http://www.vanshardware.com/reviews/2001/october/011002_TurboRing/011002_TurboRing.htm; published Oct. 2, 2001.

Web page reviewing "TurboRing"; http://www.keyalt.com/pointdevices/turboring.htm; publication date unknown, but believed to be prior to Jun. 28, 2002.

Web page for "Micro TRAC™"; http://www.microspeed.com/products/pd600s.html; publication date unknown, but believed to be prior to Jun. 28, 2002.

Web page for "Kid TRAC" model PD-280S; http://www.microspeed.com/products/kidtrac.html; publication date unknown, but believed to be prior to Jun. 28, 2002.

Web page for Kid TRAC User's Manual; http://www.microspeed.com/pages/support/manuals/kidtracm.html; publication date unknown, but believed to be prior to Jun. 28, 2002.

Web page for "Ateck" A4 RFW-33 Radio Wireless PS/2 Mouse; http://www.shop.store.yahoo.com/4itech/a4rfradwirps.html; publication date unknown, but believed to be prior to Jun. 28, 2002.

Web page for "Sakar Yahoo! 4D Internet Scroll Mouse" and "Sakar optical Mouse w/Email alert Metallic Silver (USB)"; http://www.slarp.com/products/Inpit_Devices/Mice_and_Trackballs/; publication date unknown, but believed to be prior to Jun. 28, 2002.

Web page for "ICONCEPTS 70152"; http://www.panwebi.com/products/computer/mouse/70152.htm; publication date unknown, but believed to be prior to Jun. 28, 2002.

Web page for "Yahoo 8D Internet Mouse"; http://www.panwebi.com/products/computer/mouse/8dinternetmouse.htm; publication date unknown, but believed to be prior to Jun. 28, 2002.

"Photo A": photograph of scroll wheel from LOGITECH cordless optical mouse, P/N 851497-0000; date of first availability and/or disclosure prior to (or believed to be prior to) Jun. 3, 2002.

"Photo B": (second) photograph of scroll wheel from LOGITECH cordless optical mouse, P/N 851497-0000; date of first availability and/or disclosure prior to (or believed to be prior to) Jun. 3, 2002.

"Photo C": photograph of scroll wheel from mouse manufactured by A4tech Co., Ltd., Taipei, Taiwan; date of first availability and/or disclosure prior to (or believed to be prior to) Jun. 3, 2002.

"Photo D": (second) photograph of scroll wheel from mouse manufactured by A4tech Co., Ltd., Taipei, Taiwan; date of first availability and/or disclosure prior to (or believed to be prior to) Jun. 3, 2002.

"Photo E": photograph of scroll wheel from mouse manufactured by KYE Systems, Taipei, Taiwan; date of first availability and/or disclosure prior to (or believed to be prior to) Jun. 3, 2002.

"Photo F": photograph of scroll wheel frm RAZER "Boomslang" mouse, available from Kama LLC, Taiwan, date of first availability and/or disclosure prior to (or believed to be prior to) Jun. 3, 2002.

<http://www.mside.net/microscrollii,html>, MSIDE.net, showing Micro Scroll II mouse from Micro, 2 sheets, Dec. 2000.

<http://www.contourdesign.com/rollerbar.htm>, Contour Design-RollerBar Mousing Station-Optical Technology, 2 sheets, Jan. 2001 and 1 sheet press release dated Nov. 29, 2000.

<http://www.mousetrapper.dk>, Mouse Trapper product description, 12 color sheets including original Danish language and English translation as performed by Translation Experts Ltd. Service, date of product release unknown but prior to filing date of application.

U.S. Appl. No. 10/158,998 filed Jun. 3, 2002.

U.S. Appl. No. 10/183,993 filed Jun. 28, 2002.

* cited by examiner

INPUT DEVICE INCLUDING A WHEEL ASSEMBLY FOR SCROLLING AN IMAGE IN MULTIPLE DIRECTIONS

CROSS REFERENCE TO RELATED APPLICATIONS

This application is a Continuation of U.S. patent application Ser. No. 11/094,139, filed Mar. 31, 2005 now U.S. Pat. No. 7,079,110, incorporated herein in its entirety, which is a Continuation of U.S. patent application Ser. No. 10/184,000, filed Jun. 28, 2002, incorporated herein in its entirety, which is a Continuation-in-Part application of U.S. patent application Ser. No. 09/843,794, filed Apr. 30, 2001 now U.S. Pat. No. 6,700,564, which is hereby incorporated by reference in its entirety.

FIELD OF THE INVENTION

The present invention relates to an input device including an assembly for moving an image in multiple directions on a display screen. More particularly, the present invention relates to a scroll wheel assembly that, when part of a peripheral or integral input device that is operatively connected to a host computer, can move an image in multiple axes relative to the display screen.

BACKGROUND OF THE INVENTION

Scroll wheels have been provided on computer mice and used by computer operators to move an image relative to a display screen of a host computer. A scroll wheel assembly includes a rotatable scroll wheel and a sensor that are typically included in a housing for a peripheral computer device such as a mouse. Typically, a portion of the scroll wheel protrudes upwardly out of an opening in its housing and is rotated in order to vertically scroll the image along the screen. An example of a mouse including a known scroll wheel assembly is described in U.S. Pat. No. 5,912,661, entitled "Z-ENCODER MECHANISM" which is hereby fully incorporated by reference.

Scrolling, as used herein, describes the movement of an image relative to a display screen in a particular direction as such term is commonly used in the art. For example, the term "scroll down" as used herein relates to moving the viewable contents of a file (such as a text document or image) relative to display screen by an amount to produce an effect of moving down in the document or image. Similarly, the terms scroll up, scroll left and scroll right relate to moving the viewable contents of a file relative to a screen by an amount to produce an effect of moving in the document or image up, left, and right, respectively. The term scrolling as used herein also includes panning, which is the automatic scrolling of an image.

In operation, a conventional scroll wheel is normally rotated about a transversely extending axis secured within a housing. An encoder wheel is coupled to the scroll wheel and rotates when the scroll wheel rotates. As the scroll wheel is rotated, an encoder senses the rotation of the encoder wheel, and delivers a corresponding signal to a host computer. That signal can be used to move an image, as is known in the art and disclosed in U.S. Pat. No. 5,912,661. Notably, this allows a user to scroll the image without changing the position of the mouse and/or the cursor, and instead only requires rotating the scroll wheel (versus the entire mouse or other device) with a thumb or finger. However, displayable portions of spreadsheets and many other types of documents and screen images are often wider than the display screen, and the user must also scroll horizontally across the screen to see the entire file. When the user needs to move the image horizontally across the display screen, the user must typically perform additional steps beyond what is required for vertical scrolling. This can include locating a graphical user interface in the form of a horizontal scroll bar (usually located near the bottom of the display), positioning the cursor on the scroll bar, and then rotating the wheel. Locating the scroll bar can be very difficult for people with bad eyesight, small display screens and/or poor hand-eye coordination. Using a horizontal scroll bar also requires a user to shift his or her gaze from the portion of the document being viewed, and then relocate that portion after horizontal scrolling. Even if the size of the horizontal scroll bar and/or the screen resolution can be adjusted, the user must nevertheless perform additional pointing tasks which are more time-consuming and mentally intensive than simply rotating a wheel or pushing a button. Alternative graphically assisted tools for horizontal scrolling (e.g., positioning a cursor over a horizontal scroll bar, selecting the scroll bar, and moving the cursor) also require cursor repositioning, and have similar drawbacks.

If the user does not accurately position the cursor over the horizontal scroll bar, the image will not scroll horizontally with respect to the display screen as he or she operates the mouse cursor of the graphical interface or rotates the mouse wheel. Instead, when using the mouse cursor on the graphical interface, nothing happens until he or she tries again to position the mouse cursor correctly on the scroll bar's points of operation. Or, when using the mouse wheel, the image will move vertically relative to the display screen and erroneously change the displayed image. These errors will force the user to take additional steps to reposition the desired image on the display screen. These steps include the user confirming that the cursor is not positioned on the horizontal scroll bar and rotating the scroll wheel in the opposite direction to return the image to its previous position. Unfortunately, repositioning an image can lead to errors if the image is being amended. For example, the user may not return the image to its previous position. As a result, he may amend the wrong section of the image. Even if the proper image or portion of an image is returned to the display screen, the user must still attempt to locate the bottom, horizontal scroll bar a second time in order to finally move the image in a horizontal direction.

Microside Corporation of Miami, Fla., offers a "Micro Scroll II" mouse that permits a user to scroll an image in multiple perpendicular directions. This mouse includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks. The two wheels take up limited space on the upper surface area on the mouse, which could be used for supporting the hand of the user or for additional input keys. Further, the two wheels are relatively small in size so as to accommodate both wheels on the upper surface of the mouse. The smaller sized scroll wheels make the scrolling more difficult to control. Additionally, the location of the horizontal scroll wheel can be inconvenient for effective control. Further, with this design, it might be difficult for some users to easily reach and manipulate both of the wheels.

Accordingly, there remains a need for improved input devices facilitating scrolling in multiple directions.

SUMMARY OF THE INVENTION

One aspect of the present invention relates to a peripheral device for use with a computer to scroll an image relative to an image display screen along perpendicular axes. The device comprises a housing that has at least one opening. The device also comprises a scroll wheel assembly that is provided within the housing. The scroll wheel assembly includes a rotatable member positioned within the opening of the housing. The rotatable member is rotatable about an axis that extends within the housing and is laterally movable within the opening relative to the housing. The scroll wheel assembly also includes a movement sensing system that determines when the rotatable member is moved laterally relative to the housing.

Another aspect of the present invention includes a peripheral computer input device for scrolling an image across a display screen in perpendicular directions. The device includes a housing and a scroll wheel assembly. The scroll wheel assembly includes a rotatable member that is laterally movable relative to the housing and a sensor positioned within the housing for sensing lateral movement of the rotatable member. The device also includes a controller coupled to the sensor. The controller is configured to generate a signal to scroll the image across the display screen.

Another aspect of the present invention includes a computer input device for providing scrolling capabilities of an image relative to a display screen in first and second perpendicular scrolling directions. This computer input device includes a housing and a scroll wheel. The scroll wheel is rotatable relative to the housing about an axis to cause scrolling of the image in the first direction. Additionally, the scrolling wheel is displaceable relative to the housing to cause scrolling of the image in the second direction perpendicular to the first direction without the need for repositioning the peripheral device or repositioning the hand on the device.

The present invention also includes a method of scrolling an image relative to a display screen using an input device having a housing and a member that is rotatable relative to the housing. The method includes the step of laterally moving the rotatable member relative to a plane in which the member is rotatable. The method also includes the step of scrolling the image on the display screen in response to the laterally moving step.

The device according to the present invention makes it easy for a user to scroll an image both horizontally and vertically relative to a display screen without repositioning the peripheral device. Additionally, the different types of wheel movements used by the present invention to cause scrolling in the perpendicular directions eliminate problems and frustrations that may result from using the prior art devices.

An aspect of the device is also directed to different external contours of the scrolling member for scrolling an image relative to an image display screen. In one arrangement, a portion of the scrolling member that extends through the housing is formed by opposed convex curved surfaces and a centrally disposed ring raised from the opposed convex curved surfaces. According to a more specific aspect, the external surface is formed by a ring extending around a portion of a sphere. In an alternative arrangement, the scrolling member includes a concave finger-positioning groove. The finger-engagable scrolling member is tiltable relative to the housing and has a first portion rotatable about an axis extending within the housing.

In another aspect, the device for scrolling an image includes a housing with an opening, and a finger-engagable control member in the housing with a portion thereof extending through the opening for user manipulation by a user. A rotation sensor is contained within of the finger-engagable control member. This senses the rotation of the control member relative to the housing. The sensing arrangement is preferably accomplished by an encoder. The encoder may be arranged to transmit light in a direction perpendicular or parallel to a tilting axis of the control member. The encoder may include a rotating member that periodically obstructs and permits passage of light, or that periodically reflects and absorbs light.

Another aspect of the invention for scrolling an image relative to an image display screen includes a scroll wheel assembly having a finger engaging portion exposed through an opening in the housing of the computer input device. The finger-engaging portion has first and second portions exposed for manipulation and the first portion is rotatably movable relative to the second portion. Additionally, the first and second portions are tiltable about an axis perpendicular to the axis of rotation.

Yet another aspect of the input device for scrolling is that the finger-engagable scrolling member has a rotatable portion extending through an opening in the housing of the input device. The scrolling member is mounted relative to the housing to be endlessly rotatable about a first axis and tiltable about a second axis substantially perpendicular to the first axis. The second axis intersects the scrolling member. In an alternative arrangement, the second axis also lies in the same plane as the first axis. This produces a high range of angular movement. Preferably, the scrolling member is angularly movable about the second axis in a range of motion in excess of 20 degrees, 40 degrees, and/or 50 degrees.

Another aspect provides an input device for scrolling an image. The input device has a housing with an opening, and a scrolling assembly including a finger-engagable scrolling member, a carriage, and an assembly carrier. The finger-engagable scrolling member has a first portion that extends through the opening in the housing and is endlessly rotatable relative to the carriage about a first axis. The carriage is tiltable with the finger-engagable scrolling member relative to the assembly carrier about a second axis substantially perpendicular to the first axis. Further, assembly carrier is movable within the housing with the finger-engagable scrolling member and the carriage. This arrangement provides Z-switch functionality.

In another aspect relative to the scrolling device, a cover having an aperture therein. A portion of the scrolling member extends through the aperture and an opening in the housing. The scrolling cover is tiltable with the scrolling member. This cover closes the area around the opening in the housing and protects internal components from dust and other substances. The cover may include convexly curved sides.

DETAILED DESCRIPTION OF THE INVENTION

Figure 2:
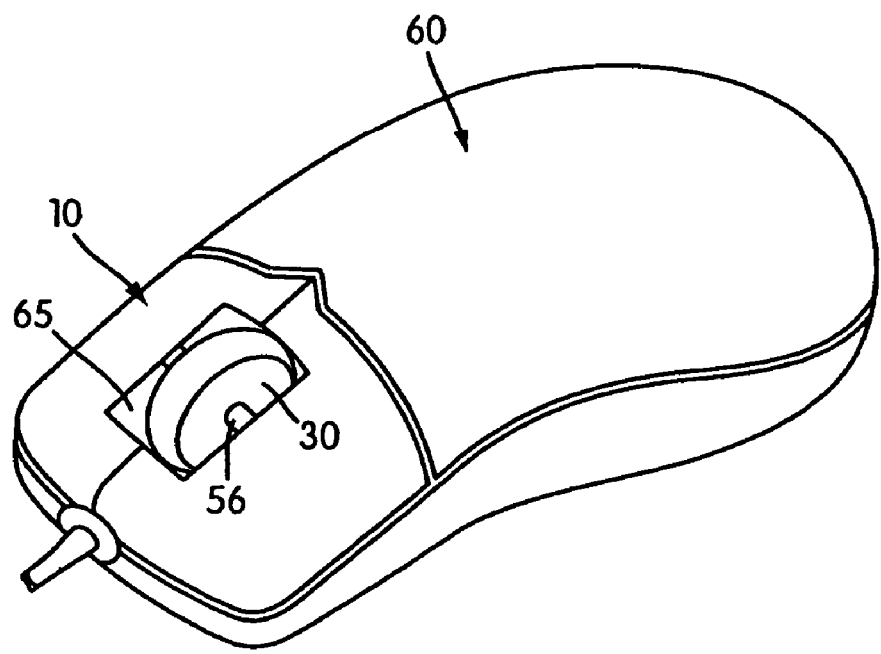
FIG. 2 shows an input device according to one embodiment of the present invention.
Figure 3:
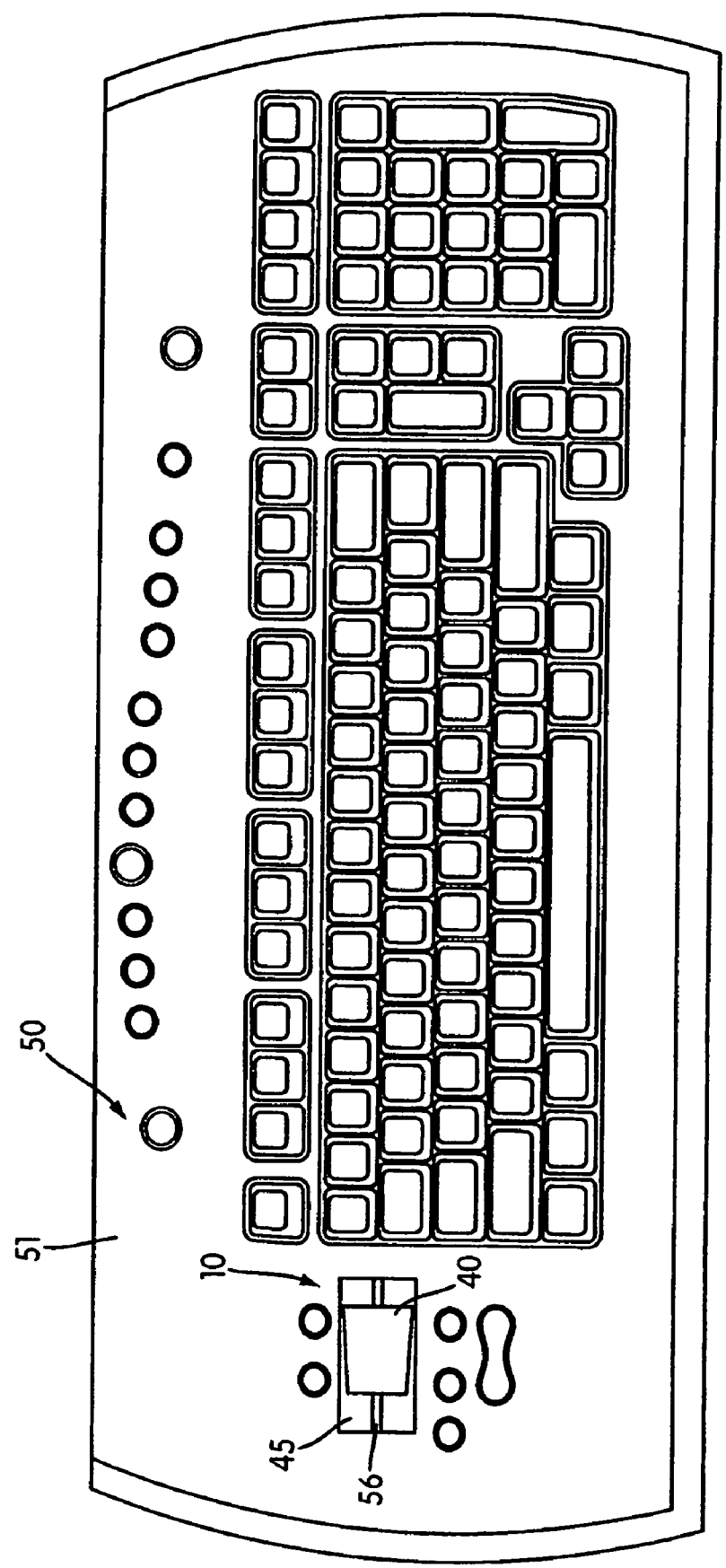
FIG. 3 shows an input device according to another embodiment of the present invention.

As shown in the figures, an exemplary embodiment of the present invention includes a scroll wheel assembly 10 having a rotatable member 30, 40 (scroll wheel) that can be used with different types of computer input devices for scrolling an image 1 in multiple directions and along multiple axes (X, Y) relative to a display screen 2 used with a host computer 8, another type of computing device, or an internet appliance. As shown in FIG. 2, one embodiment of the scroll wheel assembly 10 according to the present invention can be located within a mouse 60. As shown in FIG. 3, another embodiment of the scroll wheel assembly 10 can be located within a keyboard 50. In addition to these illustrated embodiments, the scroll wheel assemblies can also be located within other peripheral, computer input devices such as a trackball device or a similar input device. For example, the scroll wheel assemblies could also be located in the bezel of a hand-held computer, a larger portable computing device, a web pad, or Internet appliance, or could be located on the chassis of a laptop computer. Like the keyboard 50 and the mouse 60, these other known peripheral devices can have wired or wireless connections to the host computer 8 as is known in the art. The scroll wheel assembly 10 can alternatively be located in a computer monitor or in the base portion of a laptop computer. As described in more detail hereinafter, in addition to its normal rotational movement for vertical scrolling, the rotatable member 30, 40 may be moved laterally to horizontally scroll an image on the display screen 2.

As used herein, the term "lateral" to describe motion of the rotatable member includes the general side-to-side movement of a rotatable member 30, 40 within an opening of an input device in a direction that is at an angle to the plane in which the rotatable member 30, 40 is rotated. This side-to-side movement is generally in the direction of the sidewalls of the opening and can be along an axis extending perpendicular to the plane of rotation of the rotatable member 30, 40. Lateral motion also includes axi-lateral motion, which as used herein, is the movement of the rotatable member 30, 40 along the axis about which it rotates. Additionally, lateral motion can include pivoting motion experienced by the rotatable member when it is pivoted in a direction that extends at an angle to its plane of rotation in the direction of the sidewalls of the opening of the input device. As used herein, the terms "displacement" and "translation" of the rotatable member describes all other movement of the rotatable member other than its rotation about the axis about which it rotates.

As shown in FIG. 2, one embodiment of the scroll wheel assembly 10 comprises a rotatable member, such as a circular disk-shaped scroll wheel 30 positioned within an elongated opening 65 in a housing 61 of the mouse 60. A portion of the wheel 30 protrudes away from the outer surface of the mouse 60 so that it can be contacted and manipulated by a user. In a second embodiment, shown in FIG. 3, the rotatable member of the scroll wheel assembly 10 includes an elongated cylindrically shaped wheel 40 secured within an opening 55 of a housing 51 for the keyboard 50. Like the disk-shaped wheel 30, a portion of the cylindrically shaped wheel 40 protrudes above the keyboard 50 outer surface so that it can be easily contacted and manipulated by a user.

Figure 4:
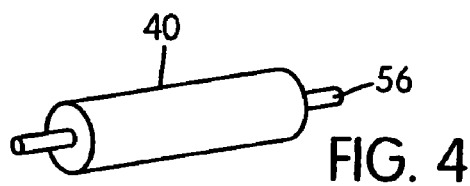
FIGS. 4–6 illustrate alternative shapes for the rotatable members shown in FIGS. 2 and 3.
Figure 5:
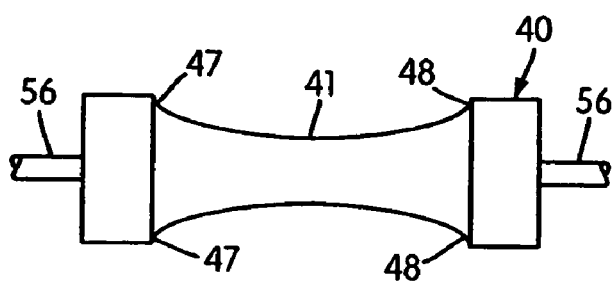
Figure 6:
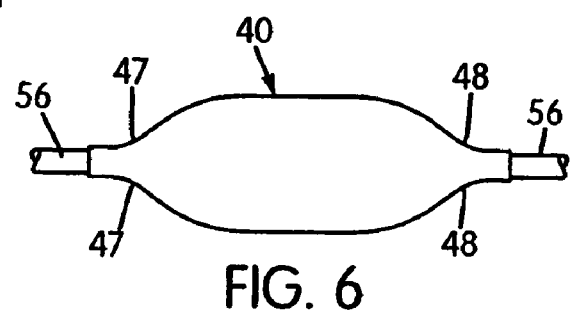

Other shapes capable of rotating relative to a housing can also be used for the rotatable members of the scroll wheel assembly 10. For example, wheel 40 could have a circular cross section of constant diameter as shown in FIG. 4. Alternatively, the wheel 40 could have a circular cross section with a central region 41 that has a reduced diameter (concave profile) as shown in FIG. 5, or a central region 42 with an increased diameter (convex profile) as shown in FIG. 6. The contoured central regions 41, 42 of the wheels 40 shown in FIGS. 5 and 6 are formed between curved side surfaces 47 and 48, respectively. The concave profile of the wheel in FIG. 5 enables the user to place a finger in the central region 41 and move the wheel 40 laterally by pushing left or right against a side surface 47 or 48 (i.e., inside-out manipulation). With the scroll wheel 40 in FIG. 6, the contoured side surfaces 47 and 48 assist in the outside-in manipulation of the wheel 40.

The outer surface of the rotatable wheels 30, 40 of the scroll wheel assembly 10 may include a rubber coating and/or grooves that are contacted by the user's finger in order to enhance scrolling control. Alternatively, the rotatable wheels 30, 40 can be provided with other types of slip resistant arrangements, such as a multi-textured coatings or a knurled surface. With regard to the embodiments illustrated in FIGS. 5 and 6, the contoured regions 47, 48 may be covered by the rubber material or slip resistant material that facilitates both the rotational movement that causes the image 1 to scroll along a Y-axis 4 and the lateral movement that causes the image 1 to scroll along an X-axis 5.

Figure 1:
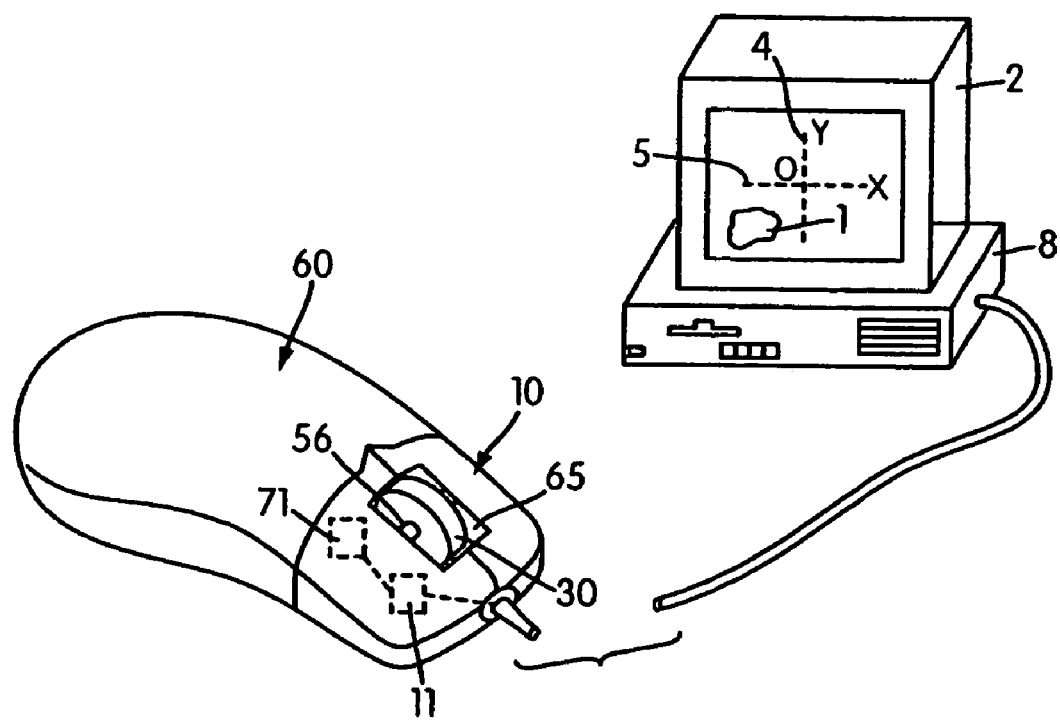
FIG. 1 illustrates an input device according to the present invention for scrolling an image on a display screen of a host computer.

For clarity, the present invention will be discussed as embodied in the keyboard 50 as illustrated in FIG. 3. However, it should be understood that the discussion of the scroll wheel assembly 10 is equally applicable for use in a mouse 60, as illustrated in FIGS. 1 and 2, and the other peripheral devices, for example trackball devices. It should also be understood that the description of the movement of the cylindrical-shaped wheel 40 as a scroll wheel relative to the housing 51 and the scrolling of the image 1 is equally applicable to the disk-shaped wheel 30.

As shown in FIG. 3, the wheel 40 is positioned within the keyboard 50 so that it extends through the opening 55 in the keyboard housing 51. The cylindrical shaped wheel 40 is positioned about and secured to a shaft 56 that defines an axis 52 extending substantially parallel to the length of the keyboard 50 and across opening 55. The wheel 40 can be keyed, adhered or otherwise attached to the shaft 56 in order to prevent relative movement between itself and the shaft 56. Alternatively, the cylindrical shaped wheel 40 and the shaft 56 may be integrally formed together. As described in conjunction with FIGS. 14*a*–14*c*, the wheel 40 may be coupled to the shaft 56 in a manner where the wheel 40 may be moved laterally relative to the shaft 56 when moved along the axis 52 but the shaft 56 will rotate with the wheel 40 about the axis 52. In yet another embodiment, not shown, the wheel 40 moves relative to the shaft 56 in rotational and lateral directions, i.e., both along the axis 52 and about the axis 52. The wheel 40 preferably has an outer diameter in the range of about 0.25 inches to about 2.0 inches, and more preferably has an outer diameter in the range of about 0.5 inches to about 1.5 inches. In a preferred embodiment, the diameter of the wheel 40 is about 0.875 inch. The wheel 40 can also have a length along the axis 52 of about 0.25 to about 2.0 inches. In a preferred embodiment, the wheel 40 has a length of about 1.125 inches. Further, in the preferred embodiment as used in the keyboard, the length of the wheel 40 is greater than its diameter.

Figure 7:
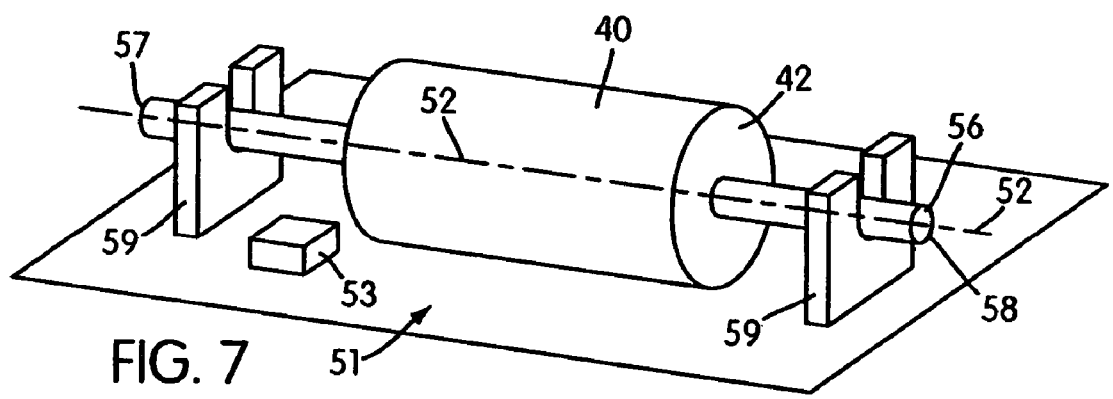
FIG. 7 is a schematic view of a scroll wheel assembly according to one embodiment of the present invention.

The shaft 56 may be coupled to the peripheral device 50, 60 in any desired manner that achieves the described functionality. FIG. 7 illustrates a first embodiment where, a first end 57 and a second end 58 of the shaft 56 are each rotatably and slidably received within support stands 59 with U-shaped openings, rings attached to the interior surface of the housing 51 or other similar supports that permit the shaft 56 to rotate and slide along the axis 52 relative to the keyboard housing 51. Similarly, the supports 59 could also be positioned along the length of shaft 56 so that they are spaced from ends 57, 58.

According to the present invention, when the user wants to scroll the image 1 on the display screen 2 in multiple directions along multiple axes 4, 5, he or she will both rotate and/or laterally move the wheel 40 relative to the keyboard housing 51 to produce vertical and/or lateral scrolling, respectively. In a manner known in the art, when the cylindrical shaped wheel 40 and shaft 56 are rotated by the user, the rotational motion is sensed by a rotational movement sensing system 87 and the image 1 is scrolled in either a positive or a negative vertical direction that extends parallel to the Y-axis 4, i.e., either up or down. Any known sensing system may be used. One rotational movement sensing system 53 that can be included is schematically illustrated in FIG. 7 and disclosed in U.S. Pat. No. 5,912,661 which has been incorporated by reference. As known in the art, this rotational movement sensing system can include a light source, an encoder wheel, and a light detector. Blades on the encoder wheel periodically obstruct the light beam when the wheel 40 is rotated. The detector senses these obstructions and is coupled to a controller 11 to generate and relay a signal to the host computer 8 to scroll the image in the Y-direction up or down.

Additionally, the scroll wheel assembly 10 includes a lateral movement sensing system 70 having at least one sensor 71 that determines when the cylindrical shaped wheel 40 is experiencing lateral motion. The scroll wheel assembly 10 also includes the controller 11 for interpreting the output from the sensor, converting it to a signal and delivering the signal to the host computer 8. The controller 11 can be any known component or combination of components that can perform these functions. In one embodiment, the controller 11 includes a microprocessor 95 connected to the sensor 71 that generates a signal for the host computer 8 indicating when the wheel 40 is being laterally moved. The generated signal controls the scrolling of the image 1 along the X-axis 5 in response to a force that causes the wheel 40 to move laterally. The signal scrolls the image 1 in a manner that is consistent with the direction and magnitude of the applied force, i.e., either left or right. Lateral movement of the wheel 40 according to the present invention includes both linear (i.e., axi-lateral) movement of the wheel 40 relative to the housing 51 and tilting or pivoting the wheel 40 in a lateral direction.

Figure 8:
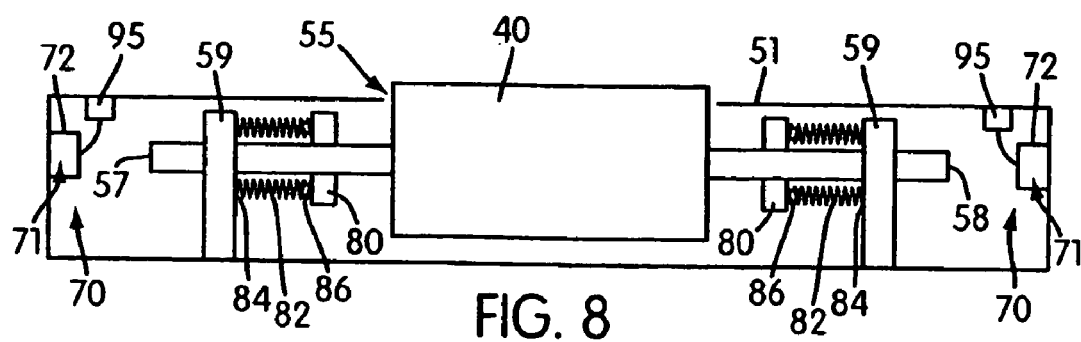
FIG. 8 is a schematic view of the scroll wheel assembly of FIG. 7 including a movement sensing system.
Figure 9:
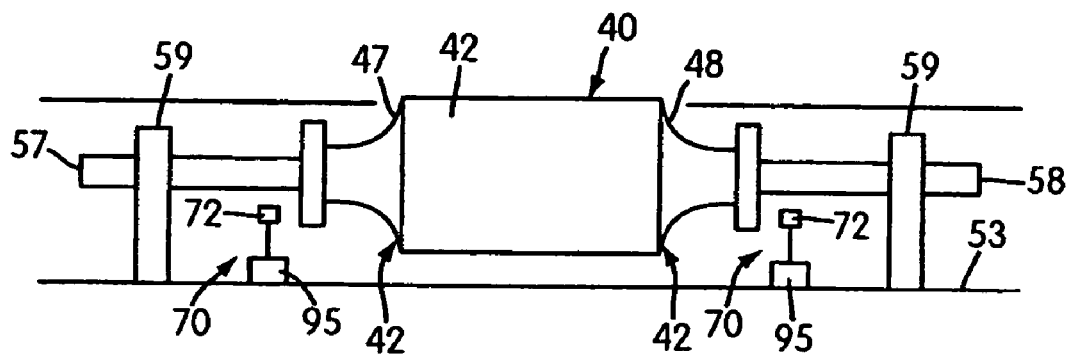
FIG. 9 is a schematic view of a scroll wheel assembly including a movement sensing system according to a second embodiment of the present invention.

As seen in the example of FIG. 8, the sensor 71 may be positioned proximate an end 57, 58 of the shaft 56. Alternatively, the sensor(s) 71 can be secured to an inner surface 53 of the housing 51 as illustrated in FIG. 9 for contacting the sidewalls 42 of the wheel 40. The sensors 71 according to the invention include contact sensors 72, a strain gauges 73 or biased force plates 74 as discussed below. Additionally, other well-known pressure and movement sensors such as optical sensors and/or mercury switches can also be used.

In an embodiment illustrated in FIG. 8, the keyboard 50 includes a contact sensor 72 positioned proximate each end 57, 58 of the shaft 56. These contact sensors 72 may be spaced away from the ends 57, 58 so that minor, unintended lateral movement of the wheel 40 will not result in the shaft 56 making contact with one of the sensors 72. In both of these embodiments, the contact sensors 72 may be positioned at a location that corresponds to the maximum allowable displacement of the shaft 56 within the housing 51.

Contact sensors 72 generate a signal that is interpreted by a microprocessor 95 and relayed to the host computer 8 after they have been contacted by an end 57, 58 of the shaft, a sidewall 42 of the wheel 40 or any other structure extending from the wheel 40 or shaft 56 such as a flange. As a result, when a user wants to move the image 1 along the X-axis 5, he or she will move the wheel 40 laterally relative to the opening 55 so that the shaft 56 slides within the housing 51 in the same direction that he or she desires to scroll until the appropriate contact sensor 72 is engaged. In the embodiment illustrated in FIG. 8, scrolling will start after one end 57, 58 of the shaft 56 makes contact with one of the contact sensors 72. In the alternative embodiment of FIG. 9, the scrolling will start after a sidewall 42 or other portion of the wheel 40 engages one of the contact sensors 72 positioned between the ends 57, 58 of the shaft 56.

The horizontal scrolling may be affected in a number of ways in response to a sensor 72 detecting the lateral movement of the wheel 40, directly or via the shaft 56. In a first embodiment, the image 1 will scroll across the screen 2 at a constant, predetermined speed, i.e., panning. The scrolling speed may be programmed, set, or changed by a user via any known technique. Alternatively, the horizontal scrolling may be time sensitive to the shifting of the wheel 40. For example, the scrolling may be at a first speed when the wheel 40 is laterally displaced for a first period of time. If the wheel 40 is laterally displaced longer than that first period of time, the scrolling speed may be increased. In another arrangement, lateral scrolling can be detected and controlled when lateral movement reaches a specified pressure, as determined by pressure sensors at each end. With the use of pressure sensors in this arrangement, the sensed pressure can also be used to determine the rate of horizontal scrolling. This could be accomplished by the use of pressure sensors with continuous sensing capabilities and by sensing the continuous pressure level, or by the use of pressure sensors with discrete sensing and the determination of one or more levels of pressure.

A system for physically biasing the wheel 40 to a central position is also preferably used. One embodiment for achieving this is shown in FIG. 8. The shaft 56 may include a flange 80 affixed thereto. One or more springs 82 are preferably positioned between the flange 80 and structure on the housing such as support 59. The spring 82 may be cantilever mounted such that it is fixed to the support 59 at one end 84 and frictionally engages the flange 80 at its other free end 86. The spring 82 will bias the wheel 40 to a central position. Preferably, the device includes such an arrangement on both sides of the wheel 40, if desired.

Figure 10:
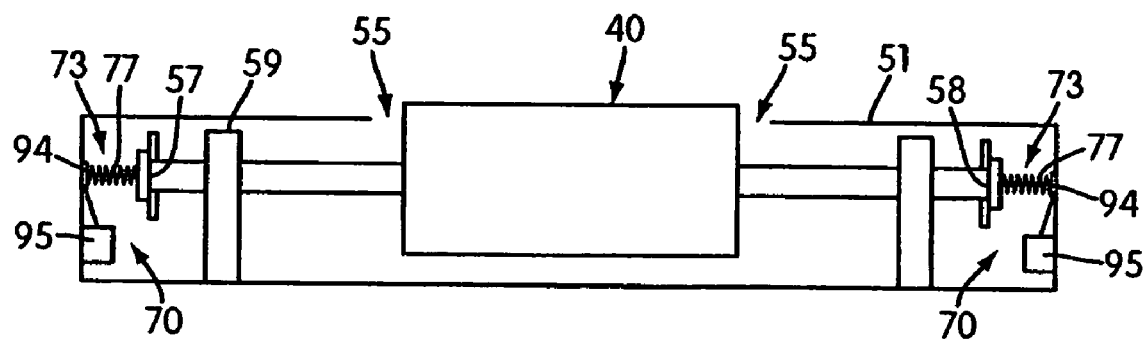
FIG. 10 is a schematic view of a scroll wheel assembly including a movement sensing system according to a third embodiment of the present invention.
Figure 11:
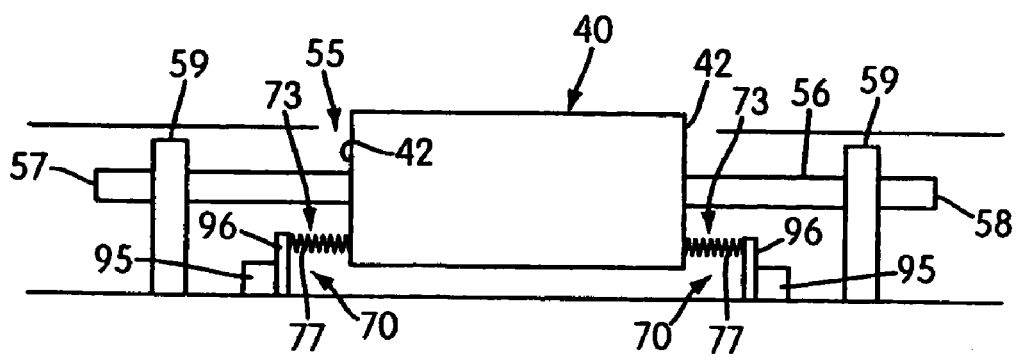
FIG. 11 is a schematic view of a scroll wheel assembly including a movement sensing system according to a fourth embodiment of the present invention.

In the embodiment illustrated in FIG. 10, the sensing system 70 includes sensors, which take the form of two strain gauges 73 that cooperate with the shaft 56 for causing horizontal scrolling. In this embodiment, one strain gauge 73 is positioned at each end 57, 58 of the shaft 56. Alternatively, the strain gauges 73 could be positioned within the housing 51 at locations spaced from the ends 57, 58 for engaging with the sides of the wheel 40 as shown in FIG. 11, or at any other desired location. Each strain gauge 73 may include a compressible/extendable member 77 that is operatively connected to a microprocessor 95 for generating an electrical signal that controls the position of the image 1 relative to the display screen 2 as discussed above. The member 77 is also rotatably coupled to a support member 94 (FIG. 10) or 95 (FIG. 11) so that the member 77 can rotate as the wheel 40 is rotated, or to the wheel 40 so that the wheel 40 will rotate relative to the compressible member 77. If desired, low friction plates may be used.

As seen in both FIG. 10 and FIG. 11, the compressible/extendable member 77 can include or be a spring, such as a helical spring. When the shaft 56 moves in a first direction within the housing 54, the spring 77 of the strain gauge 73 that is opposite the direction of the shaft movement will be extended while the spring 77 of the strain gauge 73 that is in the direction of the shaft movement will be compressed. The strain gauges 73 can be set so that either the compression or extension of their springs 77 will cause the microprocessor 95 to generate a signal that results in horizontal scrolling, and preferably in the direction of the movement of the wheel. Therefore, if the user moves the wheel 40 or the wheel 40 and shaft 56 to the right, it will cause the image to scroll right. Similarly, if the user moves the wheel 40 or the wheel 40 and shaft 56 to the left, it will cause the image to scroll left. The image can move at a constant speed or a speed that is a function of the extension or compressive forces experienced by the spring 77. In these embodiments, the springs 77 also serve to bias the wheel 40 into a central position.

Although the embodiments illustrated in FIGS. 10 and 11 have been described as including two strain gauges 73, it is possible for the present invention to operate properly with only one strain gauge 73. In this instance, the spring 77 of the strain gauge 73 could be secured to one of the ends 57, 58 of the shaft 56 or to one of the sidewalls 42. As a result, when the shaft 56 is moved in a first lateral direction, the spring 77 will be compressed. Similarly, when the shaft 56 is moved in a second lateral direction, the spring 77 will be extended. The strain gauge 73 could be electrically connected to the microprocessor 95 so that when spring 77 is compressed, scrolling occurs in a first direction, and when the spring 77 is extended, scrolling occurs in a second, opposite direction.

Figure 12:
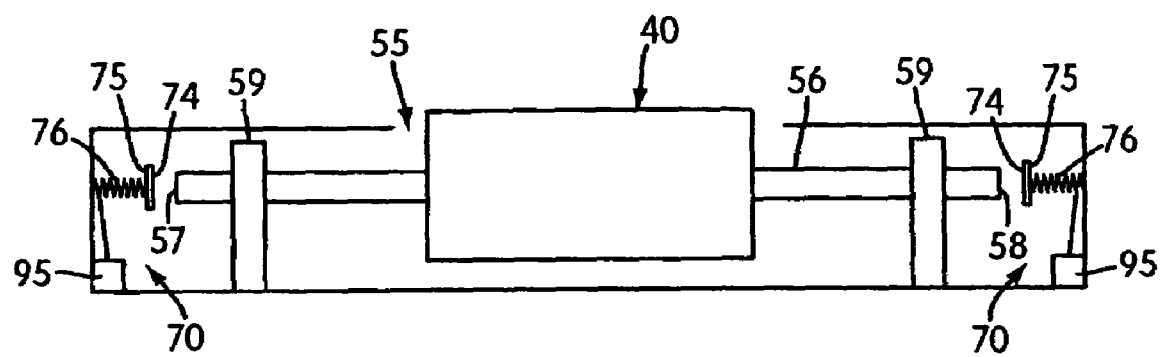
FIG. 12 is a schematic view of a scroll wheel assembly including a movement sensing system according to a fifth embodiment of the present invention.
Figure 13:
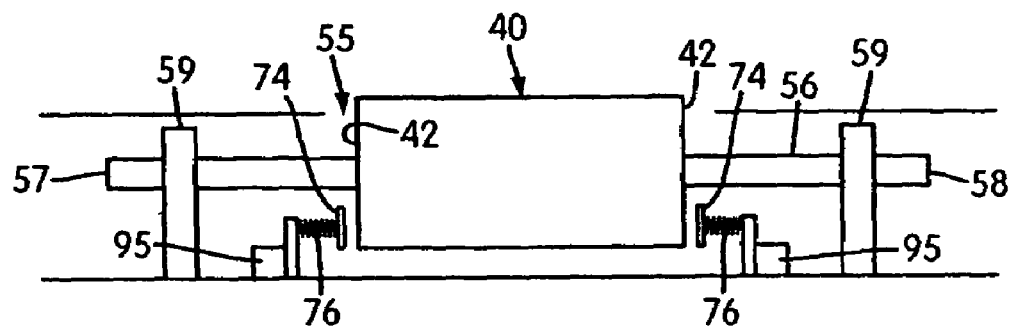
FIG. 13 is a schematic view of a scroll wheel assembly including a movement sensing system according to a sixth embodiment of the present invention.

In the embodiments shown in FIG. 12 and FIG. 13, the force plate 74 includes a contact plate member 75, and a sensor and a spring 76, coupled to a microprocessor 95 so that the image 1 will move in response to one of the springs 76 being compressed. As discussed above, the force plates 74 can each be located at one end 57, 58 of the shaft 56 for cooperating with the ends 57, 58. Alternatively, the force plates 74 can each be located at a point between the end of the shaft 56 and the opening 55 for cooperating with a sidewall 42 of the wheel 40 in response to movement of the shaft 56.

As with the other above embodiments, the shaft 56 preferably slides within housing 51 relative to the opening 55 and the force plates 74 in response to pressure being applied to the wheel 40. As pressure is applied to the wheel 40, one end 57, 58 of the shaft 56 or one of the sidewalls 42 will make contact with the contact plate 75 and begin to compress the spring 76 in the direction that the shaft 56 is moving. In response to the contact being made with the plate 75, an associated controller or microprocessor 95 will generate an image scrolling signal that will be delivered to the host computer 8. Additionally, the rate of compression experienced by the spring 76 can also be interpreted by the microprocessor. In this instance, the microprocessor will generate a signal for controlling the scrolling speed. The scrolling speed could be a function of the compression rate of the spring 76, the force applied to the spring, or a combination of the two. For example, when the plate 75 on the left side of the housing 51 is engaged, the image will begin to scroll to the left at a first rate. As more pressure is applied to the plate 75 and the spring 76, the rate at which the image scrolls will increase.

Figure 14A:
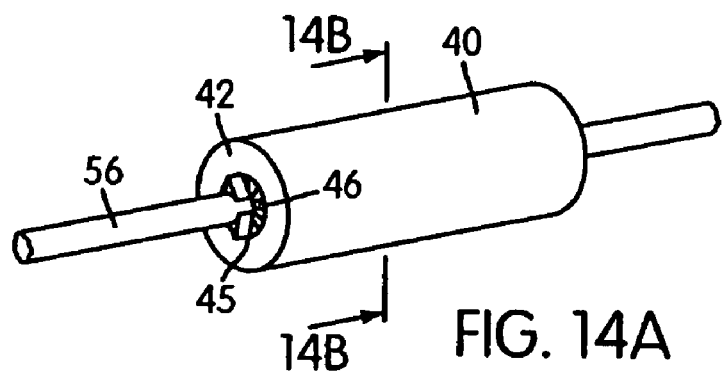
FIG. 14A is a perspective view of a rotatable member that is laterally moveable along a shaft according to the present invention.
Figure 14B:
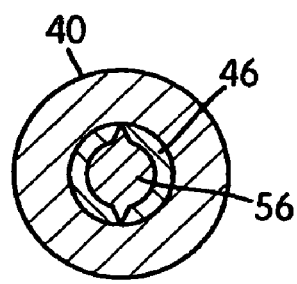
FIG. 14B is a cross section of the rotatable member illustrated in FIG. 14A taken along the line 14B—B.
Figure 14C:
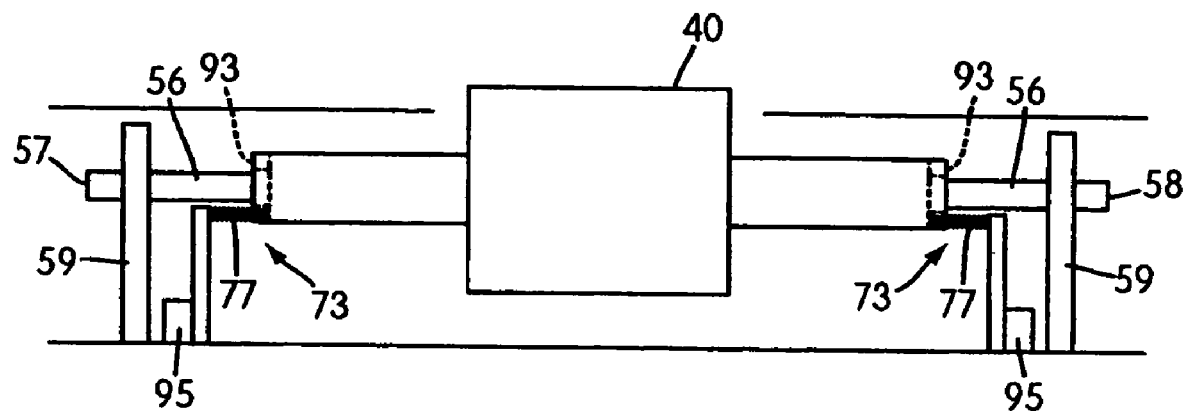
FIG. 14C is a schematic view of a scroll wheel assembly including the rotatable member shown in FIG. 14A with a movement sensing system according to a seventh embodiment of the present invention.

As shown in FIGS. 14a–14c, the wheel 40 can slide along the shaft 56 relative to the housing 54. In this embodiment, the wheel 40 includes a wheel assembly 45 that has an internal bearing surface 46 that can cause the shaft 56 to rotate as the user turns the wheel 40, so that vertical scrolling can occur. The bearing surface 46 also permits the scroll wheel 10 to slide along the shaft 56 within the opening 55 (shown in FIG. 4) in a direction that is parallel to axis 52. Thus, as shown, the external surface of the shaft 56 is shaped complimentary to the internal surface of the wheel 40. The shaft 56 may be secured against movement relative to the keyboard housing 51 in any known manner. As a result, the movement of the wheel 40 along and relative to the shaft 56 determines the direction that the image scrolls across the screen 2. Any of the above-discussed embodiments of the sensing system 70 that contact the sidewalls 42 of the wheel 40 can be used with the embodiment illustrated in FIG. 14. For example, a strain gauge 73 can be coupled to one or both sidewalls 42 of the wheel 40. This can be accomplished in one arrangement by positioning a first end of the spring 77 within a groove 93 at the end of the wheel 40 as shown in FIG. 14C. The opening to the groove 93 may be smaller than a head at the first end of the spring 77 so that the spring 77 will rotate within the groove 93 when the wheel 40 is rotated, and will not pull out of the groove 93 when the wheel 40 is moved laterally. Hence, when the wheel 40 is moved laterally, the spring 77 of the strain gauge 73 will be either compressed or extended. When the spring 77 is compressed or extended, the microprocessor will generate a signal that causes horizontal scrolling.

Figure 15:
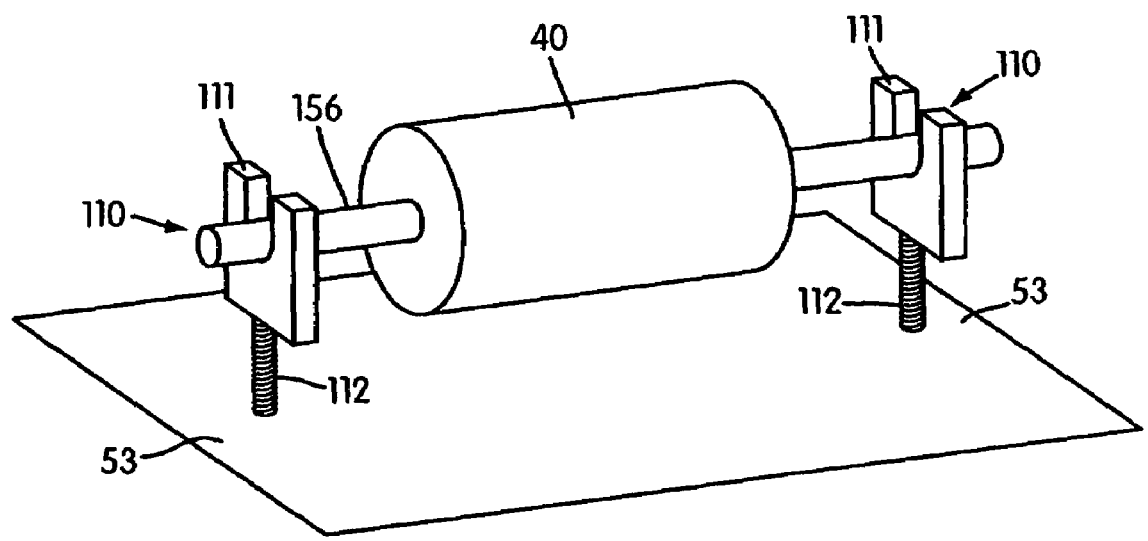
FIGS. 15 and 16 schematically illustrate a scroll wheel assembly including a movement sensing system according to an eighth embodiment of the present invention.

FIG. 15 illustrates an alternative embodiment of the present invention in which the wheel 40 is secured to a floating axle or shaft 156 positioned within the housing 51. Floating, as used herein, relates to the ability of the shaft 156 to move substantially freely in the vertical direction within the housing 51 because the supports 110 holding the shaft 156 are not rigidly positioned within the housing 51. In this embodiment, if the user wants to scroll, he or she will depress and slightly move the wheel 40 laterally within the opening 55 in the same direction that he or she wishes to scroll.

In this embodiment, the shaft 156 is supported by biased supports 110 on opposite sides of the wheel 40. Each biased support 110 includes a cradle 111 for holding the shaft 156 and a biasing member 112 such as a helical or other type of spring. Each cradle 111 can be supported within the housing 51 by a set of vertical receiving slots. These slots can be sized so that enough tolerance exists between the slots and the cradles 111 enabling the cradles 111 to move within their slots in directions other than vertical when the user contacts the wheel 40. Alternatively, the slots can be sized so that the cradles 111 are tightly surrounded by the slots and experience substantially only vertical movement. As a result, in this alternative embodiment, when a user contacts the wheel 40, the cradles 111 will not move laterally relative to the housing or toward the front and back of the housing 51. As shown in FIG. 15, each biasing member 112 may be secured or otherwise coupled to the interior surface 53 of the housing 51.

Figure 16:
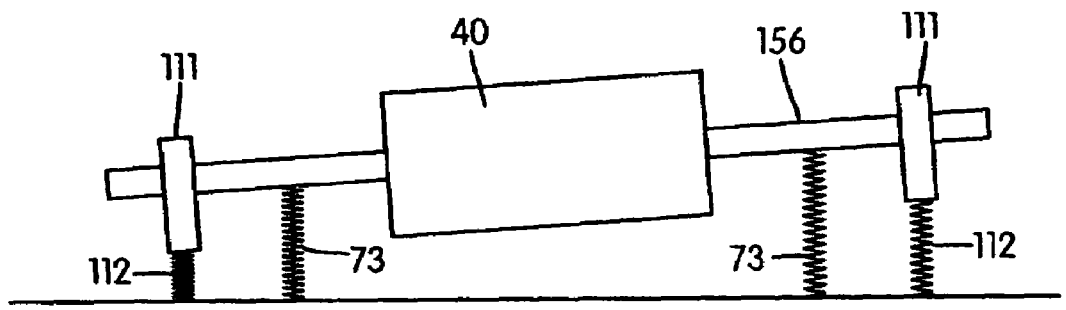

A movement sensing system 70 can be secured within housing 51 for determining the direction of scrolling in response to the movement of the shaft 156. Any of the above-discussed embodiments of the sensing system 70 could be used with the floating shaft 156 to determine when the shaft 56 and/or wheel 40 have been moved and the direction of this movement. As with the other sensing system, the sensing system 70 used with shaft 156 will cause the image 1 to horizontally scroll. If one or more strain gauges 73 are used to determine the movement of the shaft 156, each strain gauge 73 could be connected to one end 57, 58 of the shaft 56 or to one sidewall 42 of the wheel 40 as discussed above. Alternatively, the biasing member 112 could form the resilient portion of the strain gauge 73. In the embodiment illustrated in FIG. 16, the movement of the shaft 156 can be sensed by positioning the strain gauges 73 or the force plates 74 (not shown) below the shaft 156 so that the relative downward forces at the right and left sides of the shaft 156 can be detected.

Figure 17:
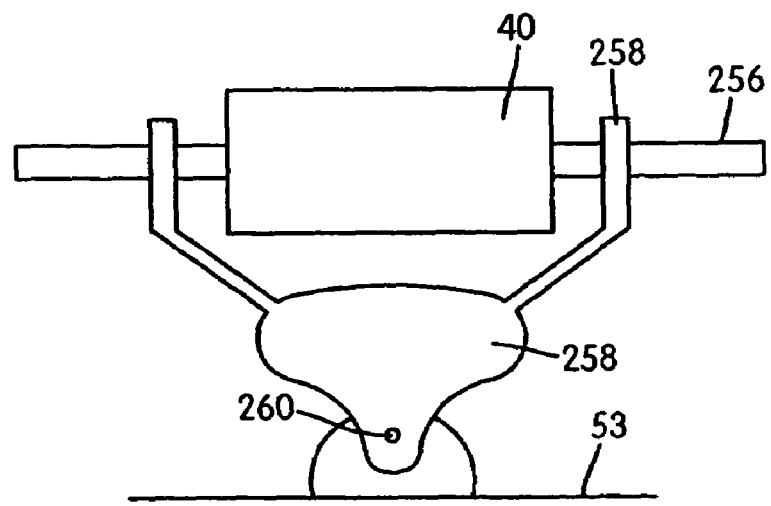
FIG. 17 schematically illustrates a scroll wheel assembly that pivots about an axis within the housing according to the present invention.

In an embodiment illustrated in FIG. 17, the wheel 40 may be secured within the keyboard so that it pivots in response to the application of pressure. In this embodiment, the wheel 40 is supported by a shaft 256 that is held by a bracket 258 or the like that pivots about a fixed shaft 260. The shaft 260 extends perpendicular to the length of shaft 256. Other known ways of pivoting shaft can also be used. In this embodiment, the entire wheel 40 and shaft 256 pivot relative to the housing 51. Therefore, when one side of the wheel 40 is pushed down, the wheel 40 will experience lateral pivotal motion relative to the housing 51 that is sensed by an employed one of the above-discussed position sensing systems 70.

Figure 18:
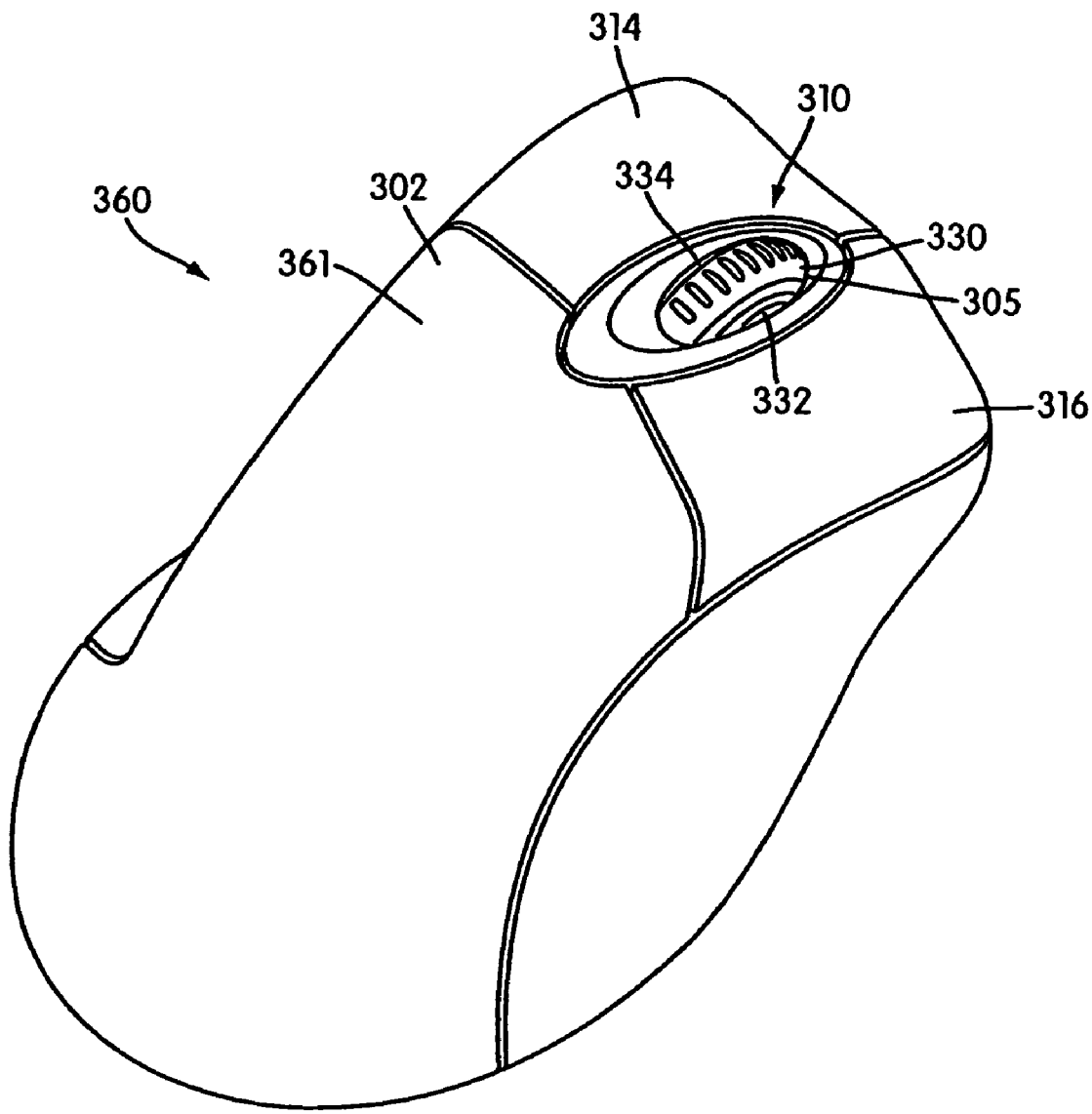
FIG. 18 is a perspective view of a mouse having a tilting scroll wheel assembly that pivots about an axis within the housing of the mouse.

FIGS. 18–34 depict alternative embodiments and arrangements of the present invention. In the depicted embodiments, the scroll wheel assemblies are laterally pivotal. As shown in FIG. 18, a scroll wheel assembly 310 has a finger-engagable control member 330 that can be used with different types of computer input devices for scrolling an image in multiple directions and along multiple axes (X, Y) relative to a display screen used with a computer or another type of computing device as depicted in FIG. 1, or an internet appliance. As shown in FIG. 18, one embodiment of the scroll wheel assembly 310 according to the present invention can be located within a mouse 360. In a conventional manner, the mouse 360 also includes a housing 302 and depressible actuators such as primary and secondary keys 314 and 316. The housing 302 has an opening 305 therein. The scroll wheel assembly 310 is mounted within the housing 302. A portion of the finger-engagable control member 330 is exposed by and extends through the opening 305 so that it can be easily contacted and manipulated by a user. As described in more detail hereinafter, in addition to at least of portion of the scroll wheel assembly 310 being rotational front to rear or rear to front for vertical scrolling, the rotatable member 330 may be pivoted laterally (i.e., side-to-side) to horizontally scroll an image on the display screen, or cause another action by the computer.

An alternative embodiment of the scroll wheel assembly 310 can be located within a keyboard and a portion thereof exposed for manipulation through a hole in the housing, such as shown in other figures within this application. In addition to these illustrated embodiments, the scroll wheel assembly 310 can also be located within other computer input devices such as a trackball device or a similar input device. For example, it could also be located in the bezel of a hand-held computer, a larger portable computing device, a web pad, or Internet appliance, or could be located on the chassis of a laptop computer. Any of these computer input devices can have wired or wireless connections to the host computer as is known in the art. The scroll wheel assembly 310 can alternatively be located in a computer monitor or in the base portion of a laptop computer.

As illustrated in FIGS. 19–22, the finger-engagable control member 330 of the scroll wheel assembly 310 includes a rotatable portion 332 and a portion 334 that is stationary relative to the rotatable portion 332. The finger-engagable control member 330 is supported within a gimble structure/tilting carriage 340 permitting the endless rotation of the finger-engagable control member 330 relative to the carriage 340 about a laterally oriented axis. The carriage 340 preferably occupies at least a portion of the lower half of the finger-engagable control member 330 and leaves the upper portion of the finger-engagable control member 330 unobstructed to facilitate user manipulation. Exemplary structure achieving this capability includes left and right axle portions 342 and 344 that protrude laterally from opposing sides of the finger-engagable control member 330 and axle receiving openings 346 and 348 in the carriage 340 for the respective axle portions 342 and 344. In an alternative arrangement, not shown, axle portions may be provided on the carriage 340 and axle-receiving openings may be provided on the finger-engagable control member 330.

The axle portion 342 on the stationary portion 334 does not rotate relative to its axle receiving opening 346. This fixed relationship is provided by adding a slot 343 or other keyed structure, and an appropriately sized opening 346 that prevents relative rotational displacement. On the rotatable portion 332 of the finger-engagable control member 330, the axle portion 344 can pivot freely relative to its axle receiving opening 348. Thus, when the finger-engagable control member 330 is rotated in the direction of arrow 400 (about axis 400a), and more specifically when a center region 336, which is preferably raised, of the finger-engagable control member 330 is rotated in the direction of arrow 400, its coupling to the carriage 340 tends to cause the rotation of only rotatable portion 332 relative to the stationary portion 334.

To further facilitate the relative rotation between rotatable portion 332 and the stationary portion 334, a portion of the rotatable portion 332 and a portion of the stationary portion 334 overlap along the axis of endless rotation 400a. Specifically, in this overlapping region, the radial outer peripheral surface 335 of stationary portion 334 and the radial inner surface 333 of movable portion 332 form interfacing annular surfaces. The outer peripheral surface 335 of stationary portion 334 provides a bearing and aligning surface for the movable portion 332 and will also aid in the balancing of the rotation of the movable portion 332 about axis 400a.

Rotation of movable portion of the finger-engagable control member 330 in the direction of arrow 400 is preferably sensed internally within the finger-engagable control member 330 (and within an area generally defined by the stationary portion 334 and the rotatable portion 332) as shown in the figures, but may be sensed externally if desired. An exemplary arrangement for sensing the rotation of the rotatable section 332 of finger-engagable control member 330 is shown in FIGS. 21–23.

Figure 21:
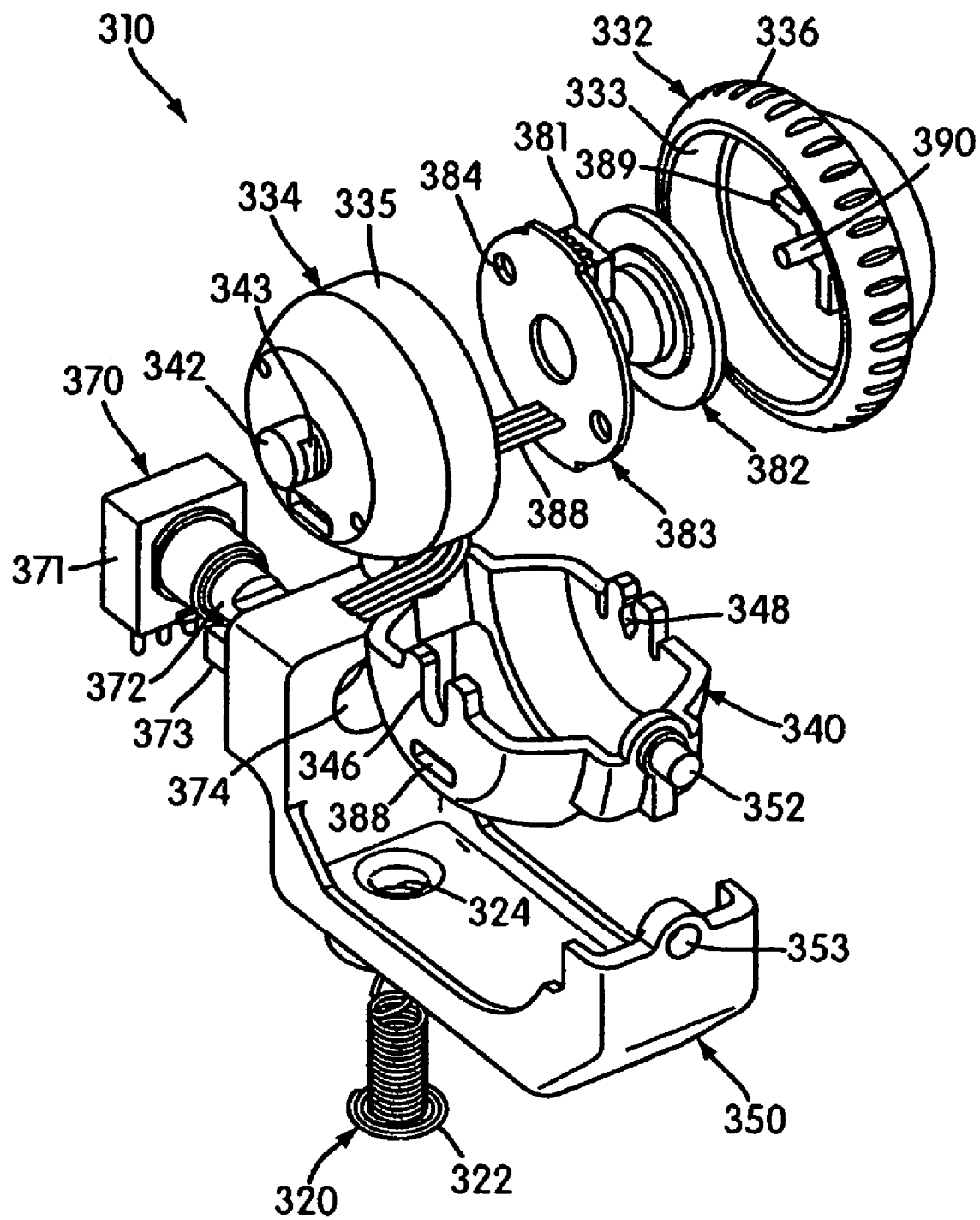
FIG. 21 is an exploded front perspective assembly view of the tilting scroll wheel assembly.
Figure 22:
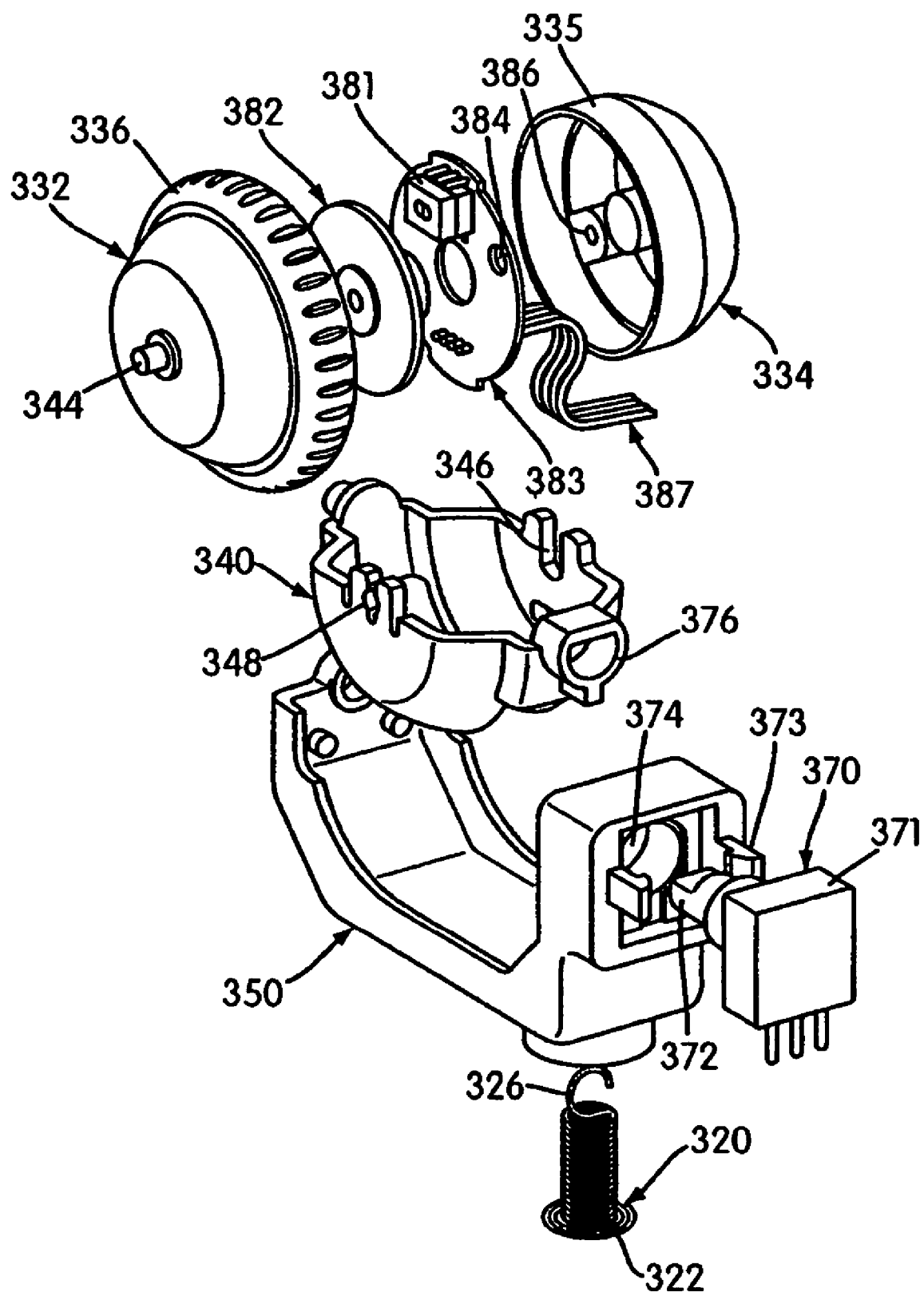
FIG. 22 is an exploded rear perspective assembly view of the tilting scroll wheel assembly.
Figure 23:
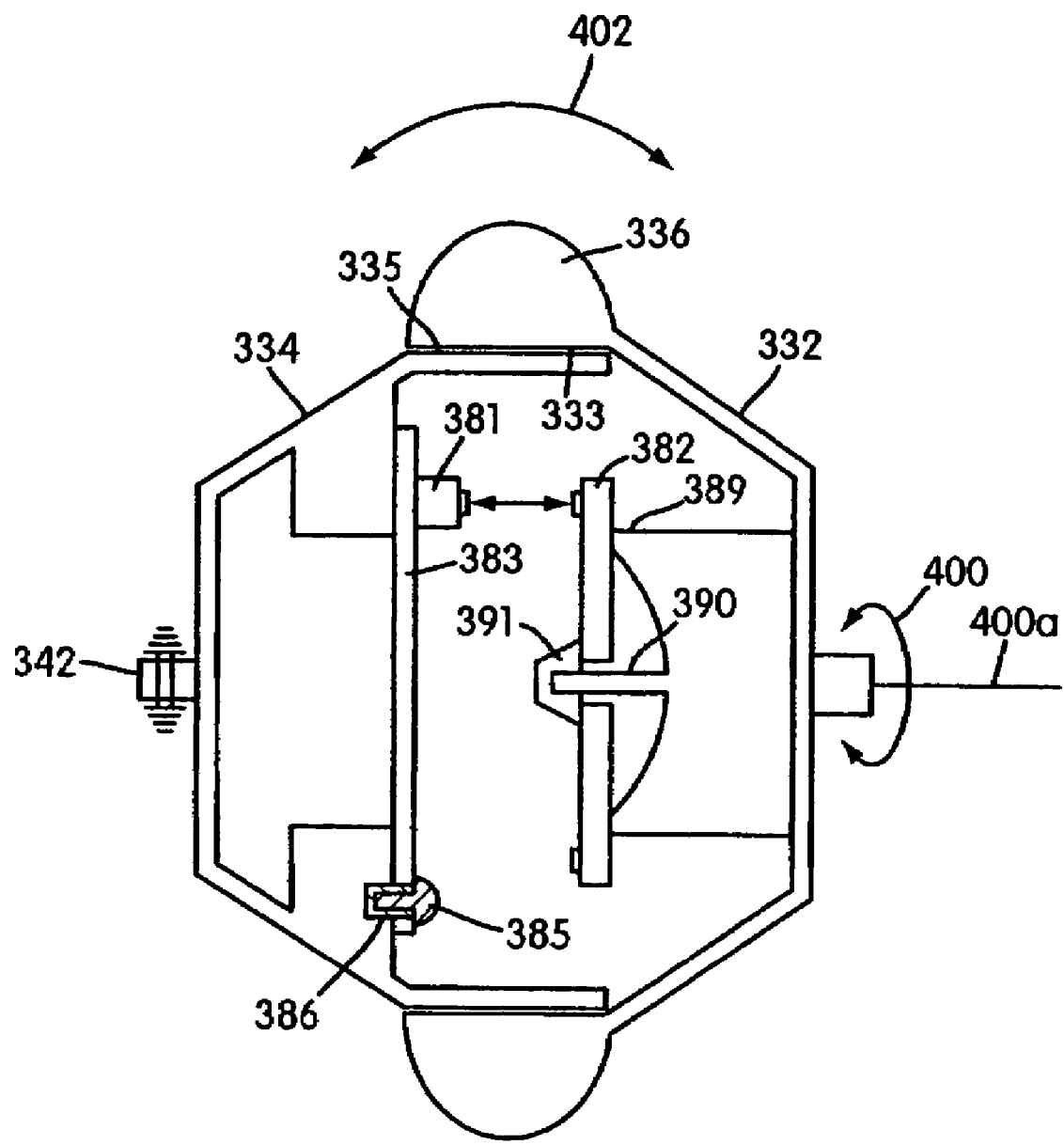
FIG. 23 is a schematic sectional view of the of the tilting scroll wheel assembly.

As seen in FIGS. 21–23, the rotational sensing system for sensing the rotation of the rotatable section 332 of finger-engagable control member 330 utilizes a reflection encoder method wherein an encoder 381 transmits lights and senses light reflected from an encoder wheel 382. The encoder 381 and the encoder wheel 382 are oriented so that the light is transmitted in a direction parallel to the axis 400a of rotation of wheel 382. The encoder wheel 382 includes angularly spaced alternating reflective and non-reflective sections that can be distinguished by the encoder 381 so that the angular displacement between the encoder wheel 382 and the encoder 381 can be determined. This contrast in light reflecting capability can be caused by etching and not etching angularly spaced regions in the side of the encoder wheel 382 that faces the encoder 381. When the rotatable section 332 is rotated, the non-reflective sections on the encoder wheel 382 periodically absorb the light from the beam, and the reflective sections on the encoder wheel 382 reflect the light from the beam back to its light-receiving detector. The detector senses these interruptions and is coupled to a controller to generate and relay a signal to the host computer to scroll the image in the Y-direction up or down based on the amount of rotation and the direction of rotation. Alternatively, in lieu of the depicted arrangement, the encoder may utilize separated transmitters and receivers with light passing through (instead of reflecting from) an encoder wheel and/or the light may be transmitted in a direction perpendicular to the axis 400a of rotation of wheel 382 such as shown in conjunction with the embodiment depicted in FIGS. 24–28.

In the depicted exemplary arrangement, the encoder 381 is coupled to the stationary portion 334 and the encoder wheel 382 is coupled to rotatable portion 332. The encoder 381 is electronically and structurally coupled to a printed circuit board 383 that is preferably mounted within and to the interior of the stationary portion 334. This mounting arrangement can be accomplished by holes 384 in the printed circuit board 383, mounting hardware 385 such as screws, and threaded holes 386 in the stationary portion 334 that receive the mounting hardware 385. Wire leads 387 electrically couple the printed circuit board 383 to a main printed circuit board, not shown, in the mouse 360 or other computer input device. This enables signals from the encoder 381 to be transmitted to a computer 8 or the like. An aperture 388 is preferably provided so that the leads 387 may extend through the wall of the stationary portion 334.

The encoder wheel 382 is structurally mounted within and to the interior of the rotatable portion 332 by any suitable arrangement. For example, in one arrangement, as depicted, the encoder wheel 382 may have a centrally located hole. The interior of the rotatable portion 332 preferably includes spacers 389, which may take the form of spokes, and an alignment shaft 390. The encoder wheel 382 is positioned over the alignment shaft 390 and spaced by the spacers 389. Either hardware 391 or a press fit arrangement may be used to lock the encoder wheel 382 to shaft 390. It is recognized that alternative mounting arrangements may be used for the encoder and encoder wheel in lieu of the depicted arrangement.

Figure 19:
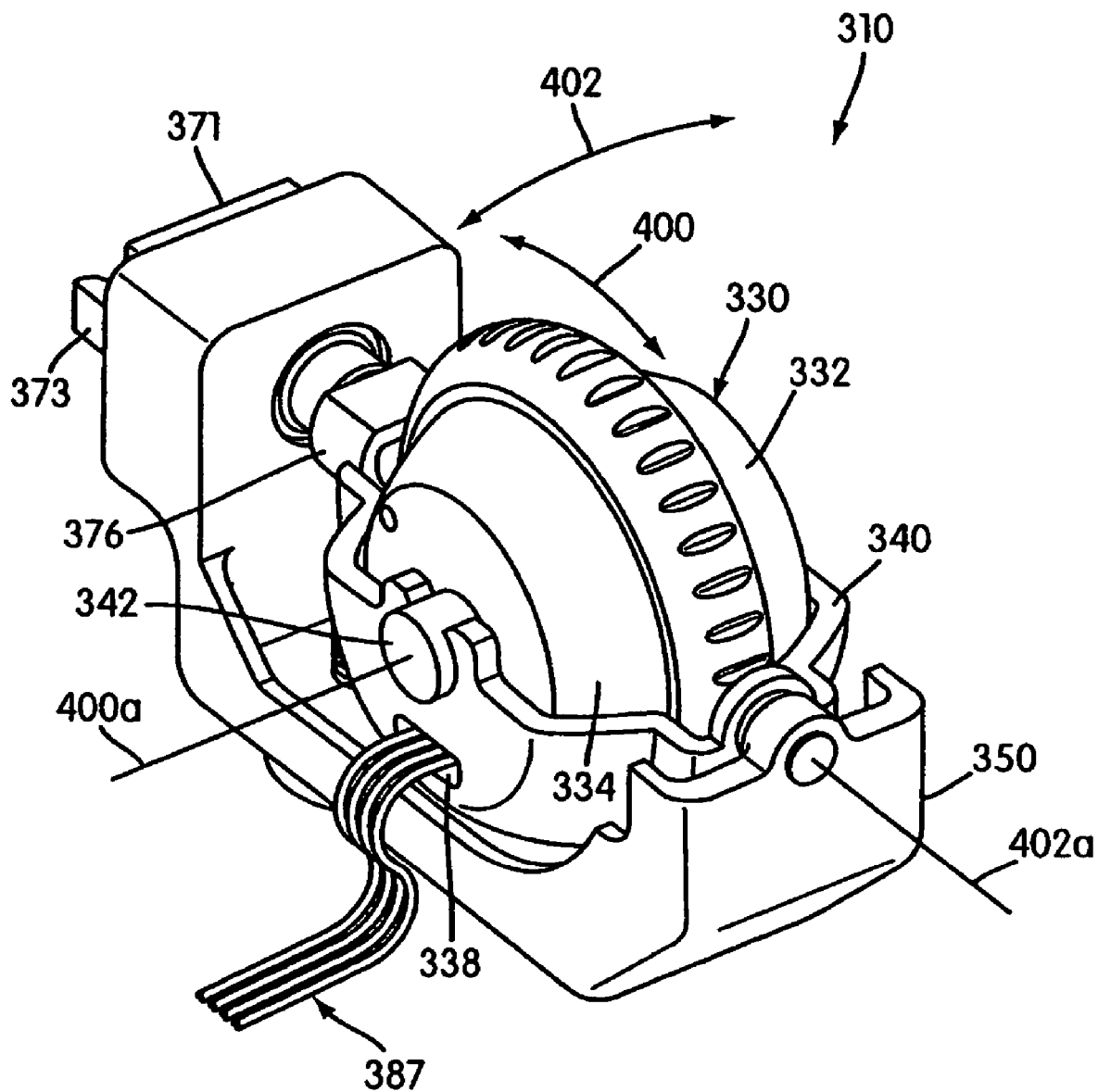
FIG. 19 is a front perspective view of the tilting scroll wheel assembly.
Figure 20:
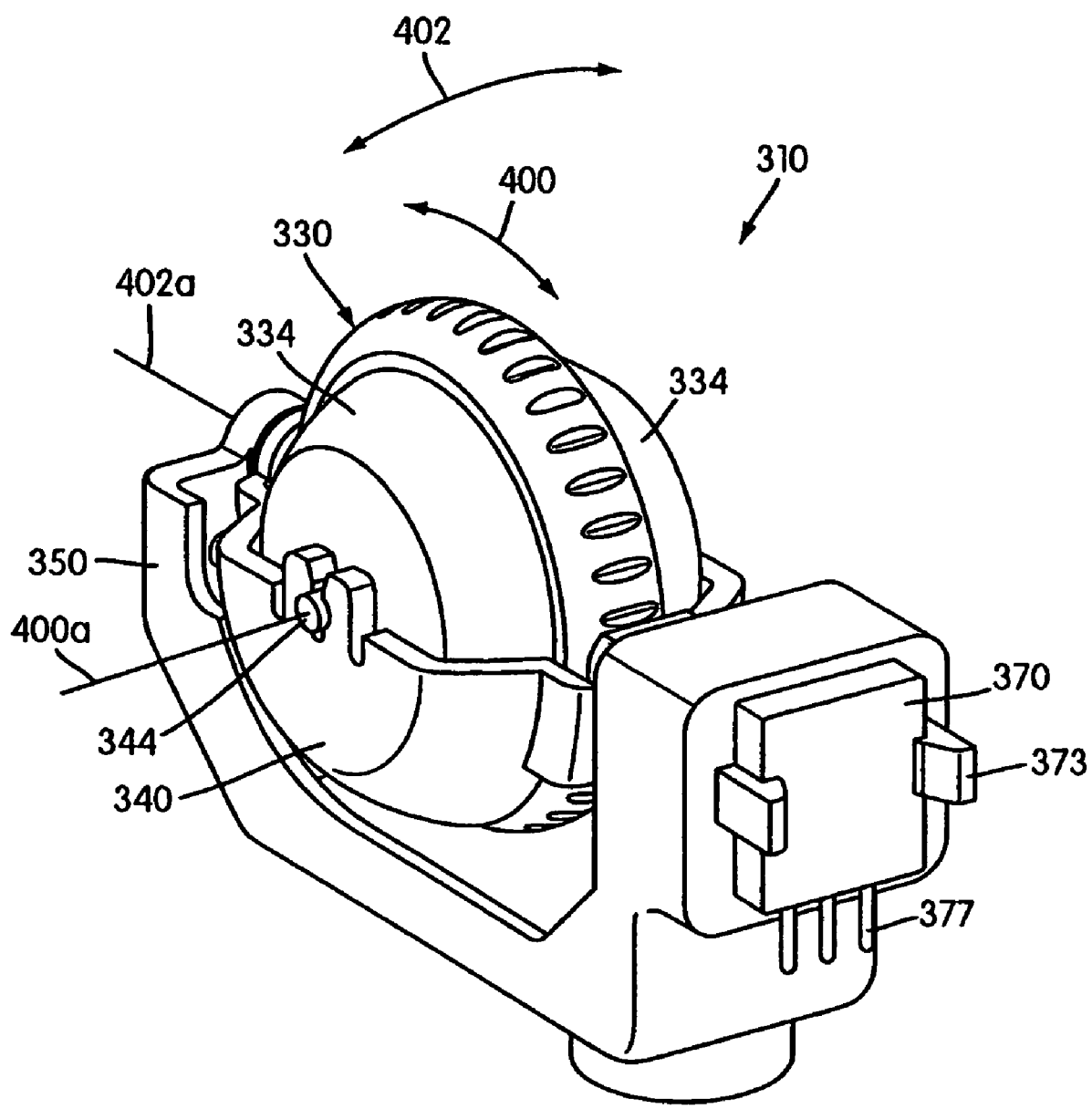
FIG. 20 is a rear perspective view of the tilting scroll wheel assembly

The carriage 340 is coupled to an assembly carrier 350 in a manner permitting the lateral pivoting of the carriage 340 relative to the carrier 350. Such an arrangement provides the user the ability to rotate the rotatable portion 332 in either opposing direction shown by arrow 400, and the ability to engage either the rotatable portion 332 or the stationary portion 334 and laterally pivot the finger-engagable control member 330 relative to the carrier 350 in either opposing direction shown by arrow 402. Such pivoting causes rotation of the finger-engagable control member 330 about axis 402a. Exemplary structure achieving this capability at the front of the carriage 340, as seen in FIGS. 19 and 21, includes an axle portion 352 that protrudes from the front side of the carriage 340 and an axle receiving opening 353 in the front of the assembly carrier 350 for receiving the axle portion 352. If desired, similar structure could be used at the rear of the carriage 340.

The arrangement depicted in FIGS. 19–22 combines the mechanical pivoting interface with a tilt sensor. Exemplary structure achieving this capability at the rear of the carriage 340, as seen in FIGS. 21 and 22, includes a potentiometer 370 that includes a stationary body 371 and a rotating axle 372 mounted for rotation within the stationary body 371. In a manner known in the art, the potentiometer senses the angular displacement of the rotating axle 372 relative to the stationary body 371. The stationary body 371 is preferably fixed to the assembly carrier 350 by any desired arrangement such as by locking clips 373. The rotating axle 372 is fixed to the carriage 340 in such a manner that angular displacement of the carriage 340 causes direct angular rotation of the axle 372. One arrangement for such a coupling is to provide a through opening 374 in the rear of the assembly carrier 350, so that the rotating axle 372 extends through the opening 374 and is fixed to the carriage 340. The axle 372 or a portion thereof may be keyed and an axle receiver 376 is provided on the rear of the carriage 340 that provide a mating keyed interface to prevent relative rotational movement between the axle 372 and the axle receiver 376 when assembled. Signals indicative of the sensed rotation are transmitted from leads 377 on the potentiometer 370 to the main circuit board on the mouse 360 or other computer input device. Alternatively, an encoder wheel and light sensor arrangement may be used to sense the tilting. In lieu of a system that provides signals relative to degrees of tilt about axis 402a, such as potentiometer 370, tilting sensors that detects one or more discrete tilt points, such as contact switches as depicted in FIGS. 24–28 may be used.

The carriage 340 is biased to a neutral position with respect to its tilting relative to assembly carrier 350. This biasing is preferably accomplished by a spring. An exemplary arrangement is to use a tension spring 320 coupled at its ends to the carriage 340 and the assembly carrier 350. The spring 320 may be disposed below the carriage 340 and the finger-engagable control member 330. As shown in FIGS. 21 and 22, a flange 322 is an integral part of the spring 320 and the bottom of the carriage may have a hole 324 therein. The hole 324 is sized, or alternatively shaped, such that the spring 320, when assembled, extends through the hole 324 but the flange 322 may not. The upper end of the spring 320 includes a hook 326 that is configured to attach to loop or similar structure, not shown, on the bottom of the carriage 340. Such structure include be a hole in a rib on the bottom of axle receiver 376. This arrangement provides a tension force to bias the carriage to a neutral position. Preferably, the center portion of the finger-engagable control member 330 extends perpendicularly to the opening 305 in the housing 302 of the mouse 360 or other computer input device including the scroll wheel assembly 310. In an alternative biasing arrangement, such as shown in conjunction with FIGS. 24–27, a torsion biasing spring may be used in lieu of the tension spring 320. Alternative biasing arrangements may be utilized.

In use, when the user wants to scroll the image 1 on the display screen 2 in multiple directions along multiple axes 4, 5, he or she will both rotate and/or laterally move the wheel assembly 410 relative to the housing 302 to produce vertical and/or lateral scrolling, respectively. When the rotational portion 332 of the scroll wheel assembly 410 is rotated by the user in the direction of arrow 400, the rotational motion is sensed by a rotational movement sensing system 381 and 382 and the image 1 is scrolled in either a positive or a negative vertical direction that extends parallel to the Y-axis 4, i.e., either up or down. When the scroll wheel assembly 410 (either the rotational portion 332 or the stationary portion 334) is laterally tilted by the user in the direction of arrow 402, the tilting motion is sensed by a tilting sensing system 370–372 and the image 1 is scrolled in either a positive or a negative horizontal direction that extends parallel to the X-axis 4, i.e., either left or right.

FIGS. 24–27 depict an alternative exemplary embodiment a scroll wheel assembly 410 having a finger-engagable control member 430 of the present invention. The scroll wheel assembly 410 is used with a mouse or other types of computer input devices as previously described and depicted for scrolling an image in multiple directions and along multiple axes (X, Y) relative to a display screen used with a host computer, another type of computing device, or an Internet appliance.

The scroll wheel assembly 410 is mounted within a housing having an opening therein. A portion of the finger-engagable control member 430 is exposed by and extends through the opening so that it can be easily contacted and manipulated by a user. As described in more detail hereinafter, in addition to at least of portion of the scroll wheel assembly 410 being rotational front to rear or rear to front for vertical scrolling, the rotatable member 430 may be pivoted laterally (i.e., side-to-side) to horizontally scroll an image on the display screen, or cause another action by the computer.

The finger-engagable control member 430 of the scroll wheel assembly 410 includes a rotatable portion 432 and a portion 434 that is stationary relative to the rotatable portion 432. The finger-engagable control member 430 is supported within a gimble structure/tiltable carriage 440 permitting the endless rotation of a portion of the finger-engagable control member 430 relative to the carriage 440 about a laterally oriented axis. The carriage 440 preferably encloses at least a portion of the lower half of the finger-engagable control member 430 and leaves the upper portion of the finger-engagable control member 430 unobstructed to facilitate user manipulation. Exemplary structure achieving this capability includes opposing axle portions 442 and 444 that protrude laterally from opposing sides of the finger-engagable control member 430 and axle receiving openings 446 and 448 in the carriage 440 for the respective axle portions 442 and 444. In an alternative arrangement, not shown, axle portions may be provided on the carriage 440 and axle-receiving openings may be provided on the finger-engagable control member 430.

The axle portion 442 on the stationary portion 434 does not rotate relative to its axle receiving opening 446. This fixed relationship is provided by a non-circular shaped axle portion 442 or another keyed structure, and an appropriately sized and shaped opening 446 that prevents relative rotational displacement. On the rotatable portion 432 of the finger-engagable control member 430, the axle portion 444 can pivot freely relative to its axle receiving opening 448. Thus, when the finger-engagable control member 430 is rotated in the direction of arrow 500 (about axis 500a), and more specifically when the center region 436 of the finger-engagable control member 430 is rotated in the direction of arrow 500, its coupling to the carriage 440 tends to cause the rotation of only rotatable portion 432 relative to the stationary portion 434.

To further facilitate the relative rotation between rotatable portion 432 and the stationary portion 434, a portion of the rotatable portion 432 and a portion of the stationary portion 434 overlap along the axis of endless rotation 500a. Specifically, in this overlapping region, the radial outer peripheral surface 435 of stationary portion 434 and the radial inner surface 433 of movable portion 432 form interfacing annular surfaces. The outer peripheral surface 435 of stationary portion 434 provides a bearing and aligning surface for the movable portion 432 and will also aid in the balancing of the rotation of the movable portion 432 about axis 500a.

Figure 26:
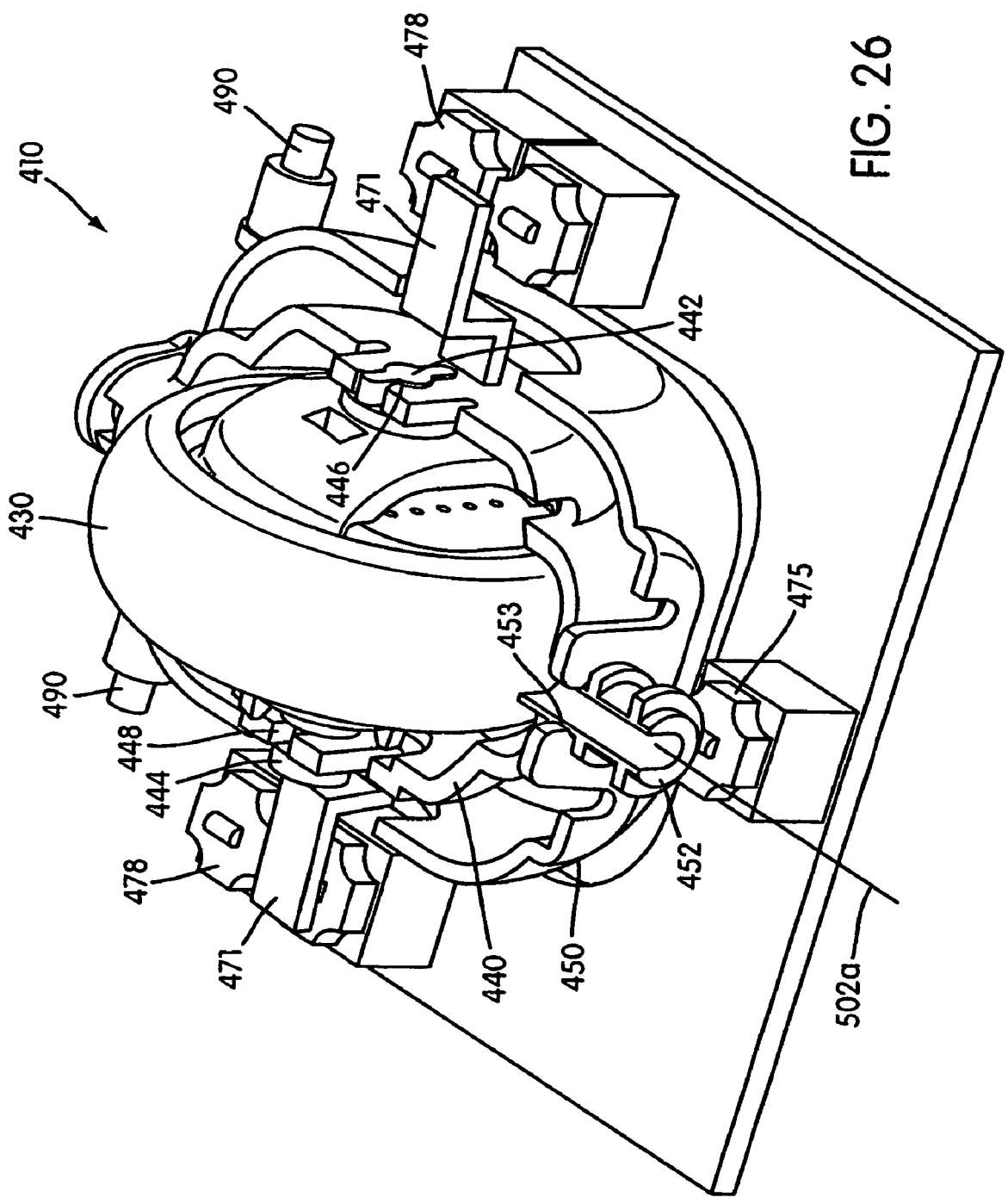
FIG. 26 is a second rear perspective view of the tilting scroll wheel assembly of FIG. 24.
Figure 28:
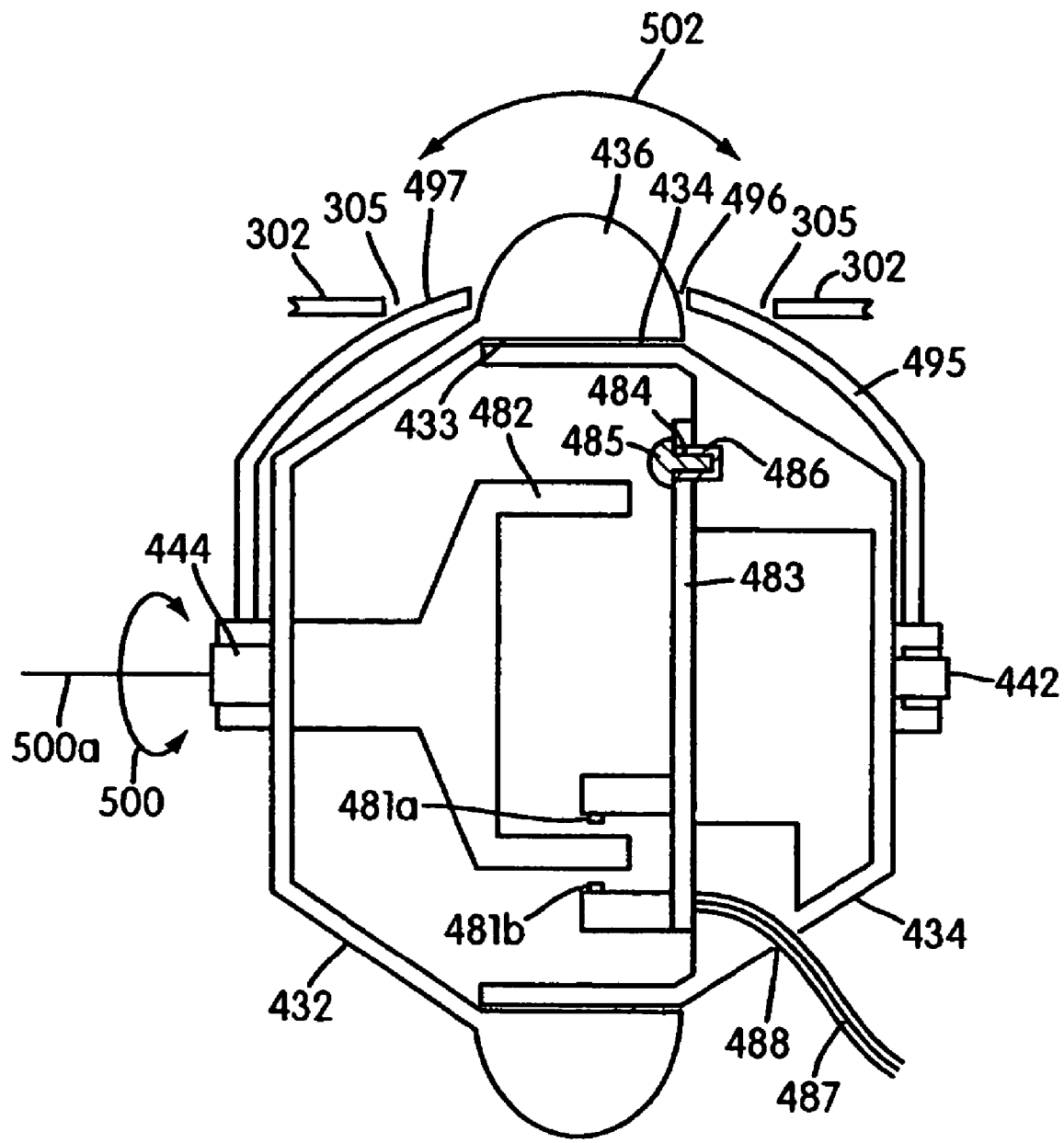
FIG. 28 is a partial schematic sectional view of the of the tilting scroll wheel assembly of FIG. 24.

Rotation of movable portion of the finger-engagable control member 430 in the direction of arrow 500 is preferably sensed internally within the finger-engagable control member 430 as shown in the figures, but may be sensed externally if desired. An exemplary arrangement for sensing the rotation of the rotatable section 432 of finger-engagable control member 430 is shown in FIGS. 26 and 28.

The rotational sensing system for sensing the rotation of the rotatable section 432 of finger-engagable control member 430 utilizes an encoder method wherein an encoder includes a light transmitter 481a that transmits lights in a direction towards a separate light detector 481b. An encoder ring 482 includes angularly alternating obstructions 482a and gaps 482b such that light from transmitter 481a can pass through gaps 482b between the obstructions 481a. The obstructions 482a on the encoder ring 482 periodically obstruct the light beam when the rotatable section 432 is rotated. The detector 481b senses these obstructions and is coupled to a controller to generate and relay a signal to the host computer to scroll the image in the Y-direction up or down based on the direction of rotation. Alternatively, in lieu of the depicted arrangement, the encoder may utilize a reflective encoder method (instead of a light pass through method) encoder wheel, and/or the light may be transmitted in a direction parallel to the axis 500a of rotation of ring 482 for example as shown in conjunction with the embodiment depicted in FIGS. 19–23. Other alternative arrangements may also be utilized.

In the depicted exemplary arrangement, the encoder 481 is coupled to the stationary portion 434 and the encoder wheel 482 is coupled to rotatable portion 432. The encoder 481 is electronically and structurally coupled to a printed circuit board 483 that is preferably mounted within and to the interior of the stationary portion 434. This mounting arrangement can be accomplished by holes 484 in the printed circuit board 483, mounting hardware 485 such as screws, and threaded holes 486 in the stationary portion 434 that receive the mounting hardware 485. In an alternative mounting arrangement, holes may be provided on the printed circuit board 483 and protruding snaps may be provided as an intergral part of stationary portion 434. Wire leads 487 electrically couple the printed circuit board 483 to a main printed circuit board, not shown, in the mouse 360 or other computer input device. This enables signals from the light receiver 481b of the encoder 481 to be transmitted to a computer 8 or the like. An aperture 488 is preferably provided so that the leads 487 may extend through the wall of the stationary portion 434.

The encoder ring 482 is structurally mounted within and to the interior of the rotatable portion 432 by any suitable arrangement. For example, in one arrangement, as depicted, the encoder ring 482 may be integrally molded with the rotatable portion 432. Alternatively, it may be coupled by hardware, snaps, or a press fit arrangement.

Figure 24:
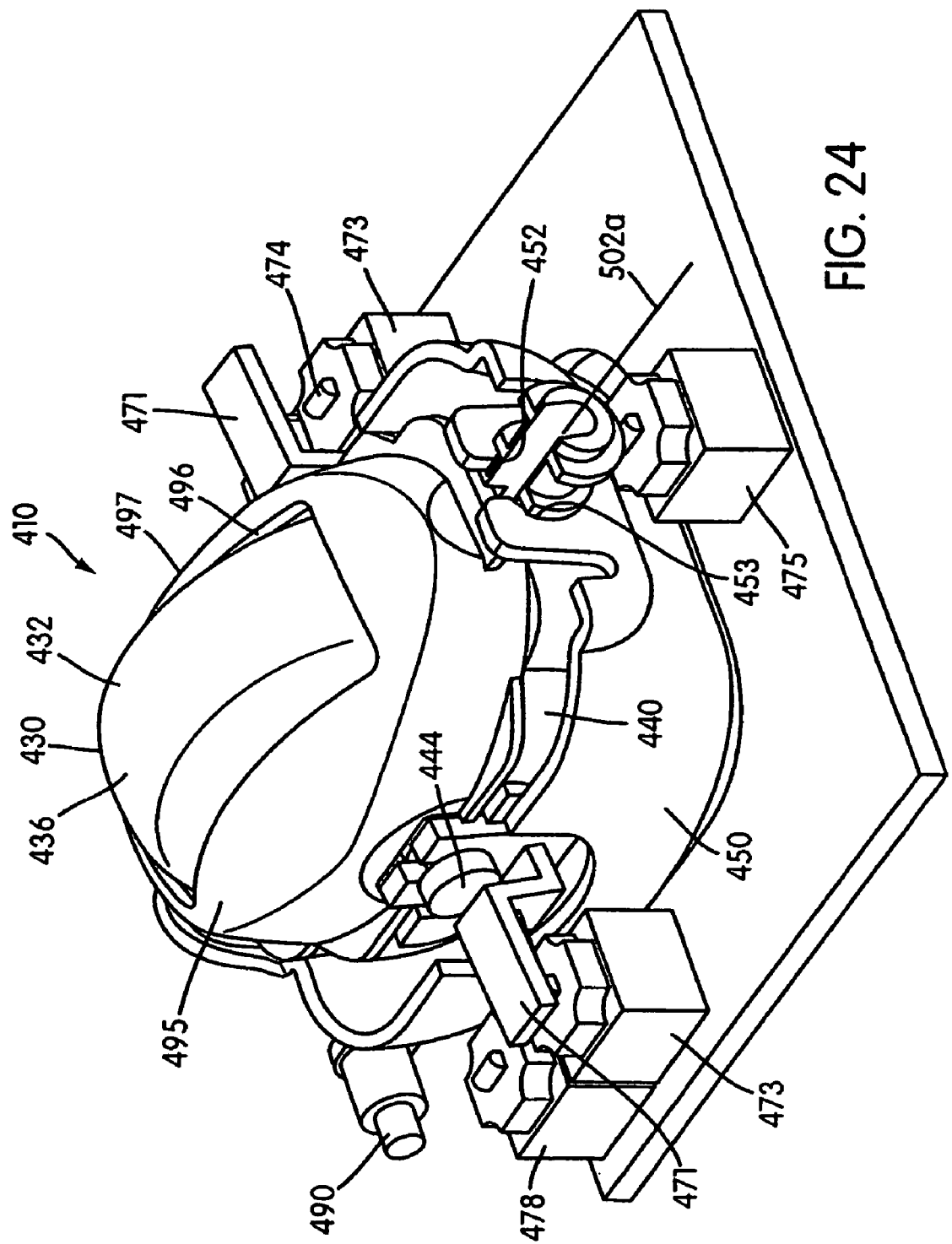
FIG. 24 is a rear perspective view of another exemplary tilting scroll wheel assembly.
Figure 25:
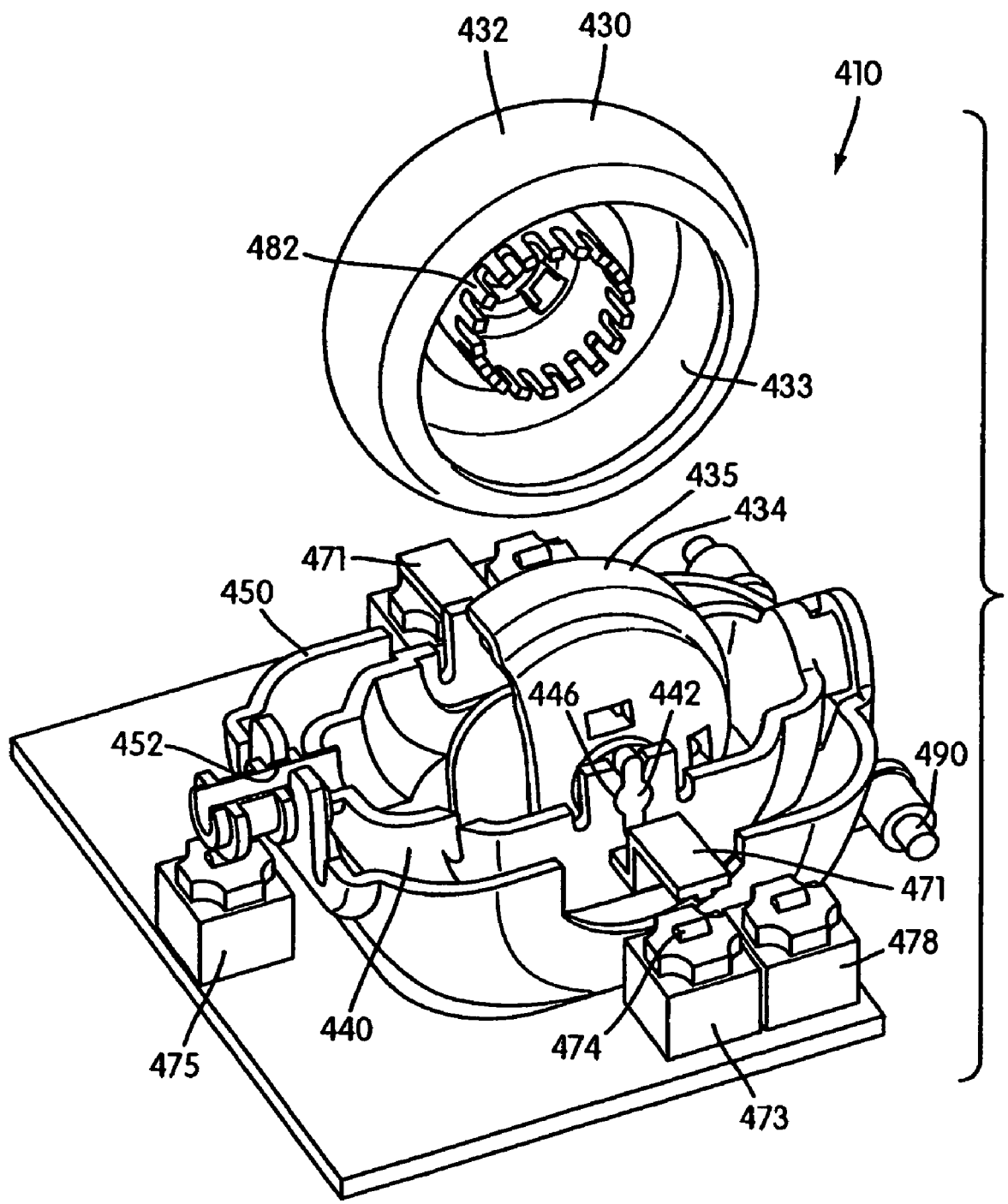
FIG. 25 is an exploded partial rear perspective assembly view of the tilting scroll wheel assembly of FIG. 24.

The carriage 440 is coupled to an assembly carrier 450 in a manner permitting the lateral pivoting of the carriage 440 relative to the carrier 450. Such an arrangement provides the user the ability to rotate the rotatable portion 432 in either opposing direction shown by arrow 500, and the ability to laterally pivot the finger-engagable control member 430 relative to the carrier 450 in either opposing direction shown by arrow 502 (FIG. 28). Such pivoting causes rotation of the finger-engagable control member 430 about axis 502a. Exemplary structure achieving this capability at the rear of the carriage 440, as seen in FIGS. 24–26, includes an axle portion 452 that protrudes from the front side of the carriage 440 and an axle receiving opening 453 in the rear of the assembly carrier 450 for receiving the axle portion 452. If desired, similar structure could be used at the front of the carriage 440.

Figure 27:
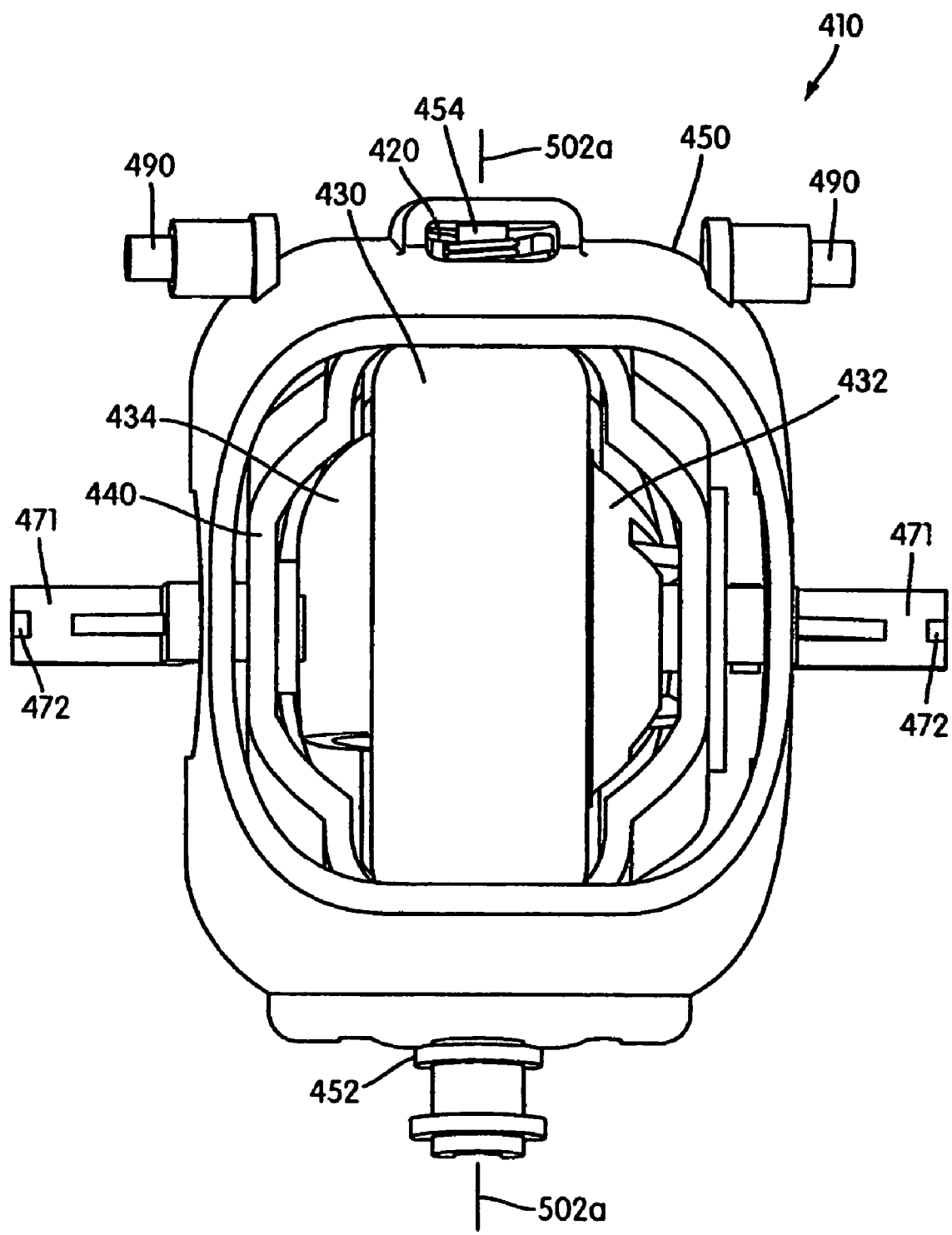
FIG. 27 is a bottom view of the tilting scroll wheel assembly of FIG. 24.

The carriage 440 is biased to a neutral position with respect to its tilting relative to assembly carrier 450. This biasing is preferably accomplished by a spring. An exemplary arrangement, as shown in FIG. 27, uses a torsion spring 420 having one end that is fixed to or bears against the carriage 440 and its other end that is fixed to or bears against the assembly carrier 450. The torsion spring 420 can extend over a forward axle portion 454. However, alternate biasing arrangements, such as but not limited to the biasing system of FIGS. 19–23 may be used. This biasing arrangement provides a rotational force to bias the carriage to a neutral position. Preferably, the center portion of the finger-engagable control member 430 extends perpendicularly to the opening in the housing of the mouse or other computer input device in this neutral position.

A tilting sensor is used to determine the angular displacement of the carriage 440 relative to the assembly carrier 450. An exemplary structure achieving this tilt sensing capability includes laterally extending contact arms 471 and contact switches 473 respectively disposed at the ends of the tilting path of the arms 471. Thus, in this arrangement, the sensors detect a specific predetermined tilt position in the positive and negative tilt directions. The contacts and open circuits of the switches may be self-contained such as in a dome-type switch. Alternatively, the underside of each arm 471 can include a conductive element 472 that contacts an open circuit region 474 of the switch 473. Signals indicative when the carriage 440 has been tilted by the predetermined angle are transmitted from switches 473 to a circuit board on the mouse or other computer input device. However, alternate angular sensing arrangement may be provided.

Alternative exemplary structure achieving this tilt sensing capability may be provided at the front or back of the carriage 440 includes a potentiometer, not shown but similar to that shown in FIGS. 21 and 22. The potentiometer senses the rotation of axle 452 relative to the assembly carrier 450. Signals indicative of the sensed rotation are transmitted from leads on the potentiometer to the main circuit board on the mouse or other computer input device. However, alternate angular sensing arrangement may be provided. Alternatively, an encoder wheel and light sensor arrangement may be used to sense the tilting.

The scroll wheel assembly 410 is preferably pivotally mounted within the housing of the mouse or other computer input device in a manner to provide a Z-switch. This is preferably accomplished by axles 490 extending from the opposing lateral sides near the front of the assembly carrier 450. However, the scroll wheel assembly 410 may be pivotally coupled adjacent its rear. The axles 490 are received in openings (not shown) in uprights within the housing in a manner to permit relative pivotal movement. An exemplary embodiment of a sensing system for determining the pivoting of assembly carrier 450 relative to the housing includes a contact switch 475 on the side opposite from the pivot axles 490. A portion of tilt axle 452 may be used to cause the contact the switch 475 when the finger-engaging portion 430 is depressed downwardly. An actuator that is part of the carrier 450 may also actuate the Z-switch. Additional contact switches 478 may similarly be provided for the depressible actuators 314 and 316, e.g., the primary and secondary buttons.

In an exemplary arrangement, a cover/shutter 495, as shown in FIGS. 24 and 28, is mounted to the carriage 440 and extends upwardly to cover a region of the stationary portion 434 and the rotatable portion 432 on either side of the center section 436, and preferably also a region in front of and behind center region 436. Thus, the shutter 495 includes an aperture 496 sized slightly larger than the center portion 436 (at its intersecting location) through which the center portion 436 extends. In this arrangement, only the center portion 436 of finger-engagable control member 430 is exposed for user manipulation. The shutter 495 extends partly through the opening 305 in the housing 302 of the mouse or other computer input device. The shutter 496 preferably includes a curved upper surface 497 on opposing sides of the center portion 436 so that the opening 305 in the housing 302 is substantially blocked regardless of the angle of tilt of the finger-engagable control member 430. The shutter 495 protects the internal components of the mouse or other computer input device from dust, dirt, and other contaminates that may potentially cause damage. If desired, the shutter 495 can extend through the opening 302 by a sufficient amount to include finger engagable surfaces on opposing sides of the rotatable center section 436 that may be used to laterally tilt the scroll wheel assembly 410.

In use, when the user wants to scroll the image 1 on the display screen 2 in multiple directions along multiple axes 4, 5, he or she will both rotate and/or laterally move the wheel assembly 410 relative to the housing 302 to produce vertical and/or lateral scrolling, respectively. When the center section 436 of the rotational portion 432 of the scroll wheel assembly 410 is rotated by the user in the direction of arrow 500, the rotational motion is sensed by a rotational movement sensing system 481a, 481b, and 482 and the image 1 is scrolled in either a positive or a negative vertical direction that extends parallel to the Y-axis 4, i.e., either up or down. When the scroll wheel assembly 410 (either the center section 436 or the shutter 495) is laterally tilted by the user in the direction of arrow 502, the tilting motion is sensed by a tilting sensing system 471 and 473 and the image 1 is scrolled in either a positive or a negative horizontal direction that extends parallel to the X-axis 4, i.e., either left or right.

It is noted that while some features of the scroll wheel assembly 410 have been depicted and described relative to one embodiment, these features can be provided in other described embodiments. For example, the shutter 495 depicted in FIGS. 24 and 28 may be used in the embodiment of FIGS. 19–23. Similarly, sensing techniques, tilting and rotational techniques, and associated structures disclosed or depicted relative to one embodiment may be used in addition or in lieu of corresponding structures in another embodiment. Additionally, disclosed aspects and features usable and desirable with a split rotating finger-engagable control member 330/430 are advantageous on other scrolling assemblies and need not be required to be on a scroll wheel assembly with movable and stationary portions.

In a preferred embodiment, the lateral tilting axis 402a/502a is preferably located substantially within the same plane as, or spaced a small distance from the rotational axis 400a/500a. Preferably, but not necessarily, the lateral tilting axis 402a/502a is preferably located to intersect the center portion 336/436. Providing the lateral titling axis 402a/502a close to the rotational axis 400a/500a provides a higher degree of control and angular tilt relative to the titling distance traveled. In one arrangement, the finger-engagable control member 310/410 may be tilted approximately 5–30 degrees clockwise or counter-clockwise from its center-biased position. That is, the 5–30 degrees of travel in both opposing angular direction provide a 10–60 degree angular range of travel. Various specific configurations of this arrangement provide ranges of angular travel equal to or in excess of 10 degrees, 20 degrees, 30 degrees, 40 degrees and 50 degrees.

Figure 29:
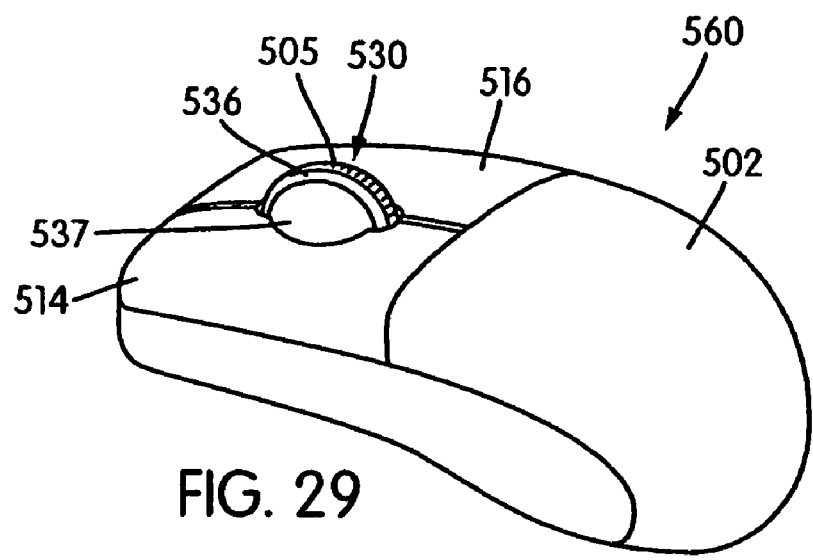
FIG. 29 is a perspective view of a mouse having a tilting scrolling device with an external contour according to an embodiment of the present invention.
Figure 30:
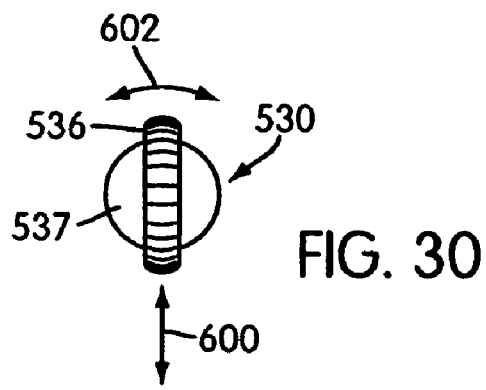
FIG. 30 shows an enlarged schematic view of the scrolling device of FIG. 29 in isolation.
Figure 31:
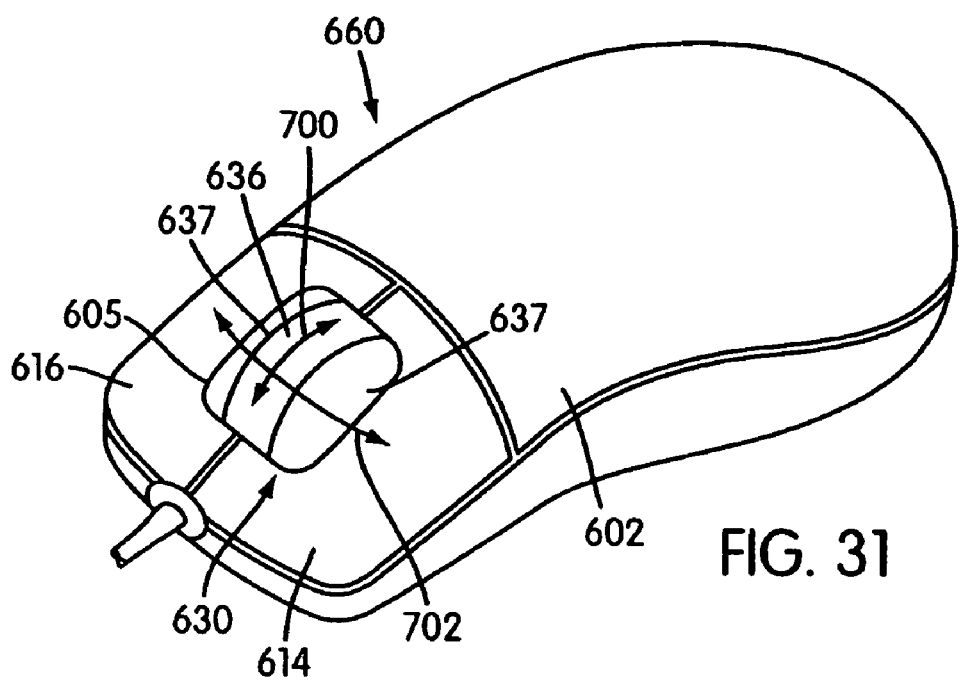
FIG. 31 is a perspective view of a mouse having a tilting scroll wheel assembly with an external contour according to another embodiment of the present invention.

The shape and contour of the portion of the finger-engagable control member may take the form of the embodiments shown in FIGS. 18–28 or may alternatively take the form of the embodiments shown in FIGS. 29–31 or portions thereof. More specifically, the finger-engagable control member 310/410 includes a raised center section 336/436 and opposing side surfaces that may be formed by a shutter or by a rotatable portion and a stationary portion. The raised center section 336/436 may optionally include grooves to assist in the rotation of the center section.

The opposing side surfaces may be angled such as shown in FIGS. 19–23, or convex and curved such as shown in FIG. 24 or FIGS. 29–31. In the embodiment of FIGS. 29 and 30, depicted on a mouse 560 with depressible actuators 514 and 516, the contour of the finger-engagable control member 530 exposed for user manipulation through an opening 505 in housing 502, takes the approximate form of a raised ring-shaped wheel 536 wrapped around a sphere 537. As schematically depicted in isolation in FIG. 30, the convex outer contour of the exposed spherical surfaces 537 on opposing sides of the wheel 536 (alone and in conjunction with the wheel 536) enhances the finger engagable surface area to permit tilting in the direction of arrow 602 while still permitting easy endless rotation of the wheel 536 in the direction of arrow 600. This combination of shapes also provides physical and cognitive cues as to how the finger-engagable control member 530 may be manipulated. The sphere 537 is preferably, but need not be, truncated in regions laterally outside of the regions that are exposed for user manipulation.

In the embodiment of FIG. 31, depicted on a mouse 660 with depressible actuators 614 and 616, the contour of the finger-engagable control member 630 exposed for user manipulation through an opening 605 in housing 602, takes the approximate form of a raised ring-shaped wheel 636 with downwardly angled sloped and slightly curved side surfaces 337. This arrangement also provides advantages as the side surfaces 637 on opposing sides of the raised center section 636 enhances the finger engagable surface area to permit tilting in the direction of arrow 702 while still permitting easy endless rotation of the wheel 636 in the direction of arrow 700. This combination of shapes also provides physical and cognitive cues as to how the finger-engagable control member 630 may be manipulated. The sphere 537 is preferably, but need not be, truncated in regions laterally outside of the regions that are exposed for user manipulation.

Figure 32:
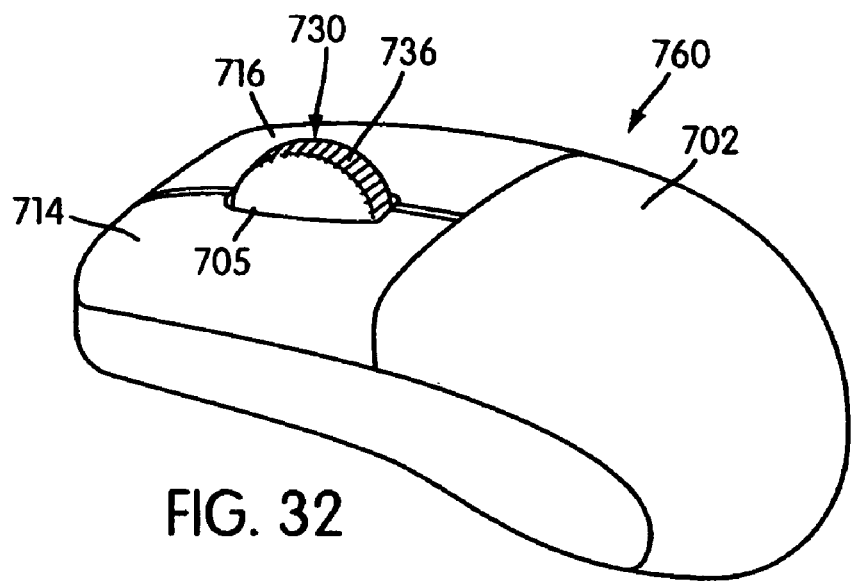
FIG. 32 is a perspective view of a mouse having a tilting scrolling device with an external contour according to another embodiment of the present invention.
Figure 33:
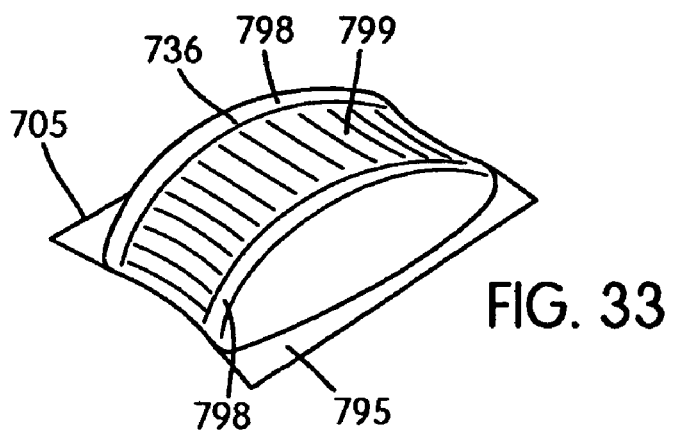
FIGS. 33 and 34 show enlarged view of the scrolling device of FIG. 32 in isolation.
Figure 34:
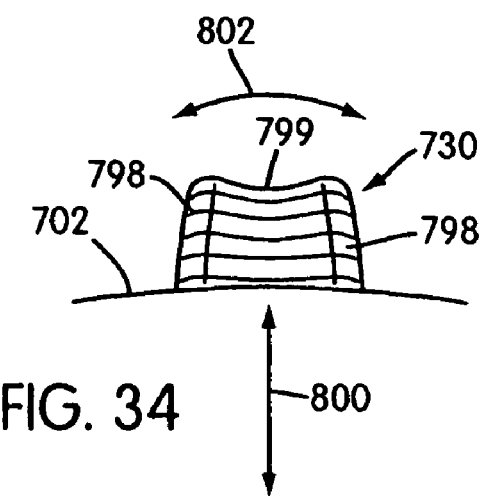

In the embodiment of FIGS. 32–34, depicted on a mouse 760 with depressible actuators 714 and 716, the contour of the finger-engagable control member 730 exposed for user manipulation through an opening 705 in housing 702, takes the approximate form of a raised ring-shaped wheel 736 with raised side edges 798 and a concave recessed center section forming a finger-locating/finger-positioning groove 799. This arrangement also provides advantages as the groove 799 assists in the single finger control of the tilting in the direction of arrow 802 as well as the endless rotation of the wheel 736 in the direction of arrow 800. A convex shutter 795 may also be provided to protect the internal components of the computer input device 760.

These arrangements are useful with software applications offering horizontal scrolling opportunities, such as various a spreadsheet program, an Internet browser, and word processor programs and especially in instances where a user would be trying to view an image that is larger than what can be completely shown on screen in the vertical and/or horizontal directions. By rolling the finger-engagable control member, a user can navigate back and forward between information on the bottom and top of the image. By tilting the finger-engagable control member horizontally, the user can navigate between views and information on the right and left of the viewed image.

The speed of the scrolling in the vertical direction may be any desirable rate relative to the rotation, and such speed may be preset or controllable and adjustable through software, e.g., a graphical user interface on a mouse driver, so that the user may select his or her own preference. Horizontal scrolling may be controlled dependent upon on the amount of time the finger-engagable control member is tilted and/or by the amount of tilt of the finger-engagable control member. Similarly, the speed of the scrolling may be preset or controllable and adjustable through software, e.g., a graphical user interface on a mouse driver, so that the user may select his or her own preferences. If desired, a time threshold for the tilting of the finger-engagable control member may be imposed prior to the initiation of horizontal scrolling to prevent inadvertent tilting from modifying the viewed image.

While the scroll wheel assembly is preferably used to cause scrolling in the horizontal and vertical directions, it may also be used to provide single commands other than "scroll right" and "scroll left". For example, as with some keys on mice and keyboards, these commands may be programmable. Thus, depending upon the embodiment, translating or pivoting the rotatable member to the left can activate a pre-programmed command such as "BACK", and moving the rotatable member to the right can activate a pre-programmed command such as "FORWARD."

Further, with the use of such a the finger-engagable control member/wheel, and modifier keys that create the ability to modify the input from the finger-engagable control member/wheel, it is possible to control document zooming or other non-scrolling actions if desired. For example, the combined actions of the Alt and Y keystrokes and manipulation of a scroll wheel could control zooming in and out. If desired, the combination of modifier keys in combination with sliding the scroll wheel horizontally could be used to angularly rotate an image on the display, such as a drawing object. In such an example, the horizontal displacement of the wheel can affect the amount of angular rotation and/or the speed of the rotation.

It is understood that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

We claim:

1. An input device for scrolling an image relative to an image display screen, said device comprising:
    a housing having at least one opening;
    a finger-engagable control member provided within said housing and having a portion extending through said opening permitting user manipulation thereof, said finger-engagable control member being endlessly rotatable about a rotating axis extending within the housing and tiltable about a tilting axis,
    a central internal area located within an internal rotatable surface of the finger-engagable control member;
    a rotation sensor positioned within the central internal area of the endlessly rotatable finger-engagable control member configured to sense rotation of the finger-engagable control member; and
    a tilt sensor configured to sense tilting of the finger-engagable control member.

2. The device of claim 1 wherein when the finger-engagable control member is rotated, a signal is transmitted to scroll the image in a first scroll direction and wherein when the finger-engagable control member is pivoted, a signal is transmitted to scroll the image in a second scroll direction, the second scroll direction being perpendicular to the first scroll direction.

3. The device of claim 1 wherein the central internal area is bounded on a first lateral side by an internal lateral surface of the finger-engagable control member.

4. The device of claim 3 further comprising an encoder wheel positioned within the central internal area.

5. The device of claim 4 wherein central internal area is laterally bounded on a second lateral side, and further comprising an encoder positioned within the central internal area.

6. The device of claim 1 wherein the tilting axis is perpendicular to the rotating axis.

7. The device of claim 1 wherein the finger-engagable control member further includes a first lateral arm extending laterally from a first lateral side and a second lateral arm extending laterally from a second lateral side, the first lateral arm and the second lateral arm being coplanar on a plane that is parallel to the rotating axis.

8. The device of claim 7 wherein pivoting of the finger-engagable control member causes a corresponding movement of the first and second lateral arms in the plane.

9. The device of claim 7 wherein the plane is further parallel to the tilting axis.

10. The device of claim 9 wherein the plane intersects the finger-engagable control member.

11. The device of claim 10 wherein the tilt sensor further includes a first contact switch at a first lateral side of the finger-engagable control member and laterally spaced from the finger-engagable control member and a second contact switch at a second lateral side of the finger-engagable control member and laterally spaced from the finger-engagable control member.

12. The device of claim 11 wherein the first lateral arm is configured to contact the first contact switch when the finger-engagable control member is pivoted in the direction of the first contact switch and the second lateral arm is configured to contact the second contact switch when the finger-engagable control member is pivoted in the direction of the second contact switch.

13. A computer input device for scrolling an image, said device comprising:
    a housing having at least one opening;
    a finger-engagable control member provided within said housing and having a portion extending through said opening permitting user manipulation thereof, said finger-engagable control member being endlessly rotatable about a rotating axis extending within the housing and tiltable about a tilting axis;

a first lateral contact arm extending laterally from a first lateral side of the finger-engagable control member and a second lateral contact arm extending from a second lateral side of the finger-engagable control member, the first lateral contact arm and the second lateral contact arm being generally horizontal;

a rotation sensor for sensing rotation of the finger-engagable control member; and a tilt sensor for sensing tilting of the finger-engagable control member, the tilt sensor having a first contact switch at a first lateral side of the finger-engagable control member along the rotating axis of the finger-engagable control member and a second contact switch at a second lateral side of the finger-engagable control member along the rotating axis of the finger-engagable control member, wherein the first lateral contact arm is configured to contact the first contact switch when the finger-engagable control member is pivoted in the direction of the first contact switch and the second lateral contact arm is configured to contact the second contact switch when the finger-engagable control member is pivoted in the direction of the second contact switch.

14. The device of claim 13 wherein when the finger-engagable control member is rotated, a signal is transmitted to scroll the image in a first scroll direction and wherein when the finger-engagable control member is pivoted, a signal is transmitted to scroll the image in a second scroll direction, the second scroll direction being perpendicular to the first scroll direction.

15. The device of claim 13 wherein the first lateral contact arm is capable of contacting the first contact switch when the finger-engagable control member is tilted in the direction of the first contact switch and the second lateral contact arm is capable of contacting the second contact switch when the finger-engagable control member is tilted in the direction of the second contact switch.

16. The device of claim 13 further comprising a carriage including a first lateral side and a second lateral side, the carriage housing at least a portion of the finger-engagable control member and being stationary when the finger-engagable control member is rotated.

17. The device of claim 16 wherein the first lateral side of the carriage is adjacent and parallel to the first lateral aspect of the finger-engagable control member and the second lateral side of the carriage is adjacent and parallel to the second lateral side of the finger-engagable control member, the first lateral arm being connected to the approximate midpoint of the first lateral side of the carriage and the second lateral arm being connected to the approximate midpoint of the second lateral side of the carriage and extending laterally from the carriage.

18. A computer input device for scrolling an image, said device comprising:

a housing having at least one opening;

a finger-engagable control member provided within said housing and having a portion extending through said opening permitting user manipulation thereof, said finger-engagable control member being endlessly rotatable about a rotating axis extending within the housing and tiltable about a tilting axis;

a first lateral contact arm extending laterally from a first lateral side of the finger-engagable control member and a second lateral contact arm extending from a second lateral side of the finger-engagable control member, the first lateral contact arm and the second lateral contact arm being generally horizontal;

a circuit board underlying the finger-engagable control member and including a first contact switch and a second contact switch thereon, the first contact switch and the second contact switch at opposite sides of the finger-engagable control member, wherein the first contact switch underlies the first lateral contact arm and the second contact switch underlies the second lateral contact arm.

19. The device of claim 18 wherein the first lateral contact arm is configured to contact the first contact switch when the finger-engagable control member is pivoted in the direction of the first contact switch and the second lateral contact arm is configured to contact the second contact switch when the finger-engagable control member is pivoted in the direction of the second contact switch.

20. The device of claim 19 wherein the circuit board further includes a third contact switch thereon behind the finger-engagable control member, the device further comprising a carriage housing at least a portion of the finger-engagable control member and being inwardly displaceable about a displacement axis that is perpendicular to the tilting axis and parallel to the rotating axis, the third contact switch underlying the carriage.

* * * * *